(12) United States Patent
Takenaka et al.

(10) Patent No.: US 10,865,543 B2
(45) Date of Patent: Dec. 15, 2020

(54) WORK VEHICLE

(71) Applicant: KOMATSU LTD., Tokyo (JP)

(72) Inventors: Yuita Takenaka, Tokyo (JP);
Masanobu Nakabayashi, Tokyo (JP);
Masanori Ikari, Tokyo (JP)

(73) Assignee: KOMATSU LTD., Tokyo (JP)

( * ) Notice: Subject to any disclaimer, the term of this patent is extended or adjusted under 35 U.S.C. 154(b) by 215 days.

(21) Appl. No.: 16/080,217

(22) PCT Filed: May 29, 2017

(86) PCT No.: PCT/JP2017/019926
§ 371 (c)(1),
(2) Date: Aug. 27, 2018

(87) PCT Pub. No.: WO2017/209055
PCT Pub. Date: Dec. 7, 2017

(65) Prior Publication Data
US 2019/0017245 A1 Jan. 17, 2019

(30) Foreign Application Priority Data
May 31, 2016 (JP) .................................. 2016-109164

(51) Int. Cl.
*E02F 9/20* (2006.01)
*B62D 1/12* (2006.01)
(Continued)

(52) U.S. Cl.
CPC .............. *E02F 9/2004* (2013.01); *B62D 1/12* (2013.01); *B62D 5/06* (2013.01); *B62D 5/087* (2013.01);
(Continued)

(58) Field of Classification Search
CPC .......... B62D 12/00; B62D 5/06; B62D 5/087; B62D 5/09; B62D 1/12; B62D 5/28;
(Continued)

(56) References Cited

U.S. PATENT DOCUMENTS 3,451,498 A 6/1969 Molby
4,641,849 A 2/1987 Andre
(Continued)

FOREIGN PATENT DOCUMENTS

CN 102917942 A 2/2013
CN 105599803 A 5/2016
(Continued)

OTHER PUBLICATIONS

The extended European search report for the corresponding European application No. 17806610.6, dated Sep. 6, 2019.
(Continued)

*Primary Examiner* — Tony H Winner
*Assistant Examiner* — Felicia L. Brittman
(74) *Attorney, Agent, or Firm* — Global IP Counselors, LLP

(57) ABSTRACT

An articulated work vehicle includes a hydraulic actuator, a control valve, a joystick lever, and a first link mechanism. A front frame is linked to a rear frame. The hydraulic actuator is configured to be driven by hydraulic pressure and configured to change a steering angle of the front frame with respect to the rear frame. The control valve is configured to control flow of fluid supplied to the hydraulic actuator. The joystick lever is disposed in a cab provided on the rear frame. The joystick lever is configured to be operated by an operator. The first link mechanism is disposed below the cab. The first link mechanism is configured to transmit an operation of the joystick lever to the control valve.

10 Claims, 22 Drawing Sheets

(51) Int. Cl.
   *B62D 12/00*   (2006.01)
   *B62D 5/06*    (2006.01)
   *B62D 5/087*   (2006.01)
   *B62D 5/09*    (2006.01)
   *E02F 9/22*    (2006.01)
   *B62D 5/28*    (2006.01)
   *E02F 9/08*    (2006.01)
   *B62D 5/04*    (2006.01)

(52) U.S. Cl.
   CPC ............. *B62D 5/09* (2013.01); *B62D 5/28* (2013.01); *B62D 12/00* (2013.01); *E02F 9/2285* (2013.01); *B62D 5/0406* (2013.01); *B62D 5/0457* (2013.01); *B62D 5/091* (2013.01); *E02F 9/0841* (2013.01)

(58) Field of Classification Search
   CPC .... B62D 5/0406; B62D 5/0457; B62D 5/091; E02F 9/2004; E02F 9/2285; E02F 9/0841
   USPC ........................................................ 180/418
   See application file for complete search history.

(56) References Cited

U.S. PATENT DOCUMENTS

| | | |
|---|---|---|
| 6,179,082 B1 | 1/2001 | Ikari |
| 6,202,501 B1 | 3/2001 | Ikari |
| 2013/0068544 A1 | 3/2013 | Itou et al. |
| 2014/0182277 A1* | 7/2014 | Kuipers ................. B62D 5/091 60/327 |
| 2018/0105202 A1* | 4/2018 | Ikari ...................... B62D 5/006 |

FOREIGN PATENT DOCUMENTS

| | | | |
|---|---|---|---|
| DE | 1755541 A1 * | 8/1971 | ............ B62D 12/00 |
| EP | 0 165 159 A2 | 12/1985 | |
| JP | 46-9007 B1 | 3/1971 | |
| JP | 54-90726 A | 7/1979 | |
| JP | 11-105723 A | 4/1999 | |
| JP | 11-321664 A | 11/1999 | |
| JP | 2004-74817 A | 3/2004 | |
| JP | 2005-82057 A | 3/2005 | |
| JP | 2005-205924 A | 8/2005 | |
| JP | 2006-347212 A | 12/2006 | |
| JP | 2007-106308 A | 4/2007 | |
| JP | 2007-185985 A | 7/2007 | |
| JP | 2008-143456 A | 6/2008 | |

OTHER PUBLICATIONS

The Office Action for the corresponding Chinese application No. 201780012094.6, dated Jan. 3, 2019.

The International Search Report for the corresponding international application No. PCT/JP2017/019926, dated Jun. 27, 2017.

* cited by examiner

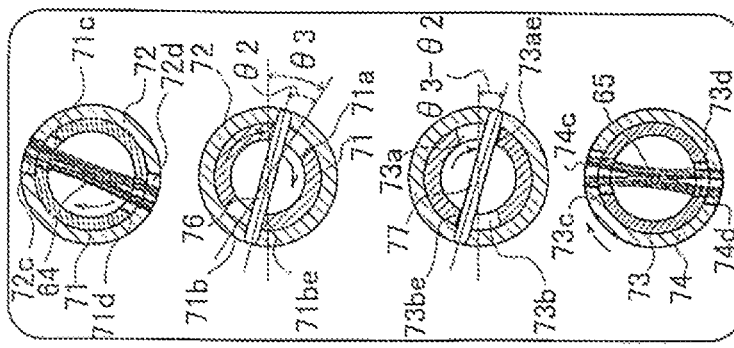
FIG. 14C  FIG. 14D  FIG. 14E
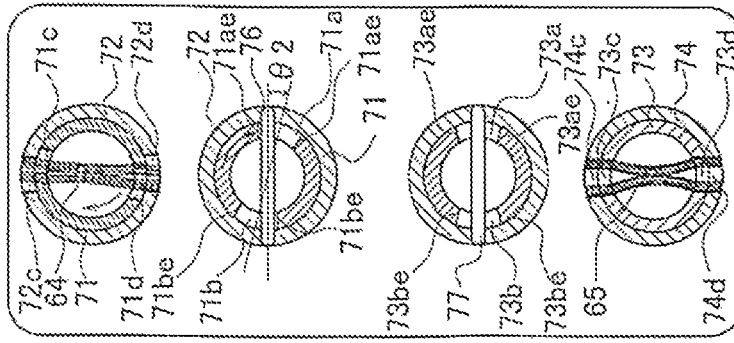
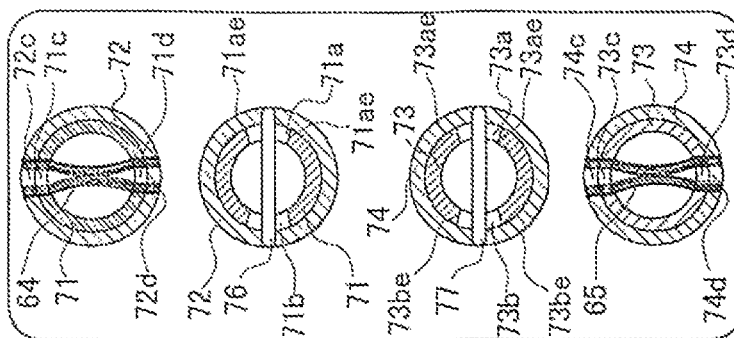
FIG. 14A
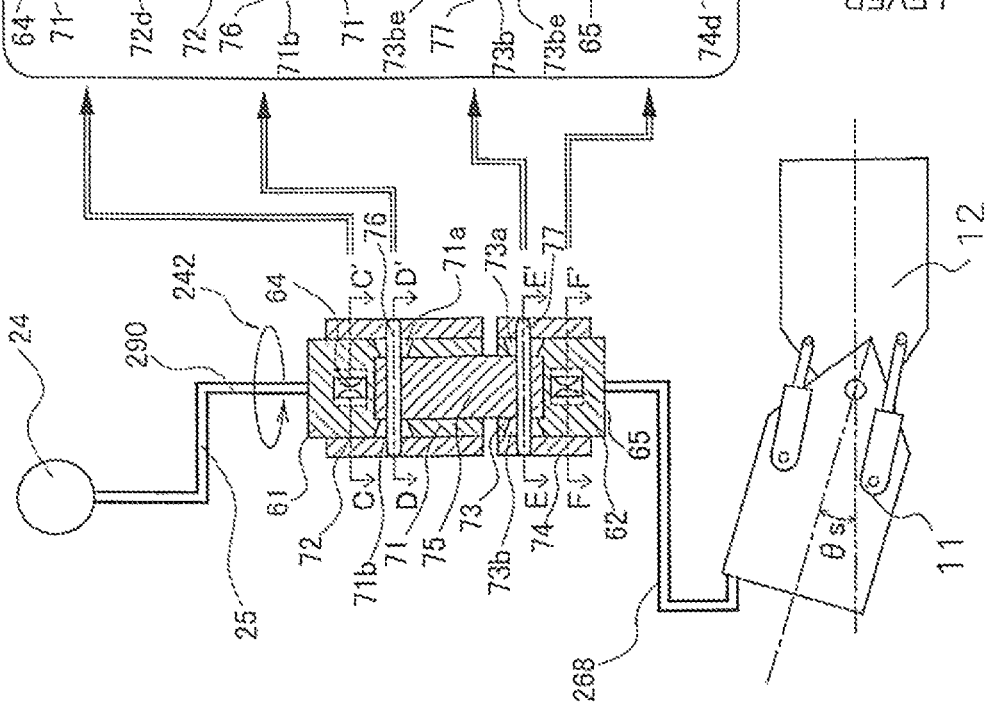
FIG. 14B

WORK VEHICLE

CROSS-REFERENCE TO RELATED APPLICATIONS

This application is a U.S. National stage application of International Application No. PCT/JP2017/019926, filed on May 29, 2017. This U.S. National stage application claims priority under 35 U.S.C. § 119(a) to Japanese Patent Application No. 2016-109164, filed in Japan on May 31, 2016, the entire contents of which are hereby incorporated herein by reference.

BACKGROUND

Field of the Invention

The present invention relates to an articulated work vehicle.

Background Information

As an articulated work vehicle, a configuration has been disclosed in which the steering angle is varied by controlling the flow of fluid supplied to a hydraulic actuator disposed spanning a front frame and a rear frame (see, for example, JP-A H11-105723 and JP-A H11-321664).

With the work vehicles in JP-A H11-105723 and JP-A H11-321664, the operator operates the joystick lever to change the pilot pressure by opening or closing the port of the pilot valve. The flow of fluid supplied from the steering valve to the hydraulic actuator is adjusted according to the changed pilot pressure, and this changes the steering angle of the work vehicle.

Here, the joystick lever is disposed to the side of a driver's seat provided on the rear frame of the work vehicle. Also, in order to transmit the operation of the joystick lever with a simple configuration, the pilot valve is disposed under the driver's seat and nearly directly under the joystick lever.

SUMMARY

However, in the case of a small work vehicle, there is not much room under the driver's seat, and the pilot valve cannot be disposed below the seat as in JP-A H11-105723 and JP-A H11-321664.

In view of the above problem encountered with a conventional work vehicle, it is an object of the present invention to provide a work vehicle with which there is greater latitude in choosing where to install the valve.

To achieve the stated object, the work vehicle according to a first aspect is an articulated work vehicle in which a front frame and a rear frame are linked, comprising a hydraulic actuator, a control valve, a joystick lever, and a first link mechanism. The hydraulic actuator is driven by hydraulic pressure to change the steering angle of the front frame relative to the rear frame. The control valve controls the flow of fluid supplied to the hydraulic actuator. The joystick lever is disposed in a cab provided on the rear frame and is operated by an operator. The first link mechanism is disposed on the lower side of the cab and transmits the operation of the joystick lever to the control valve.

Here, the first link mechanism is provided on the lower side of the cab in order to transmit the operation of the joystick lever to the control valve, so the control valve can be disposed at a location away from the driver's seat, not just at a location that is nearly directly under the driver's seat. Therefore, it is possible to arrange the control valve at a location that is better suited to the structure of the work vehicle. Therefore, there is greater latitude in choosing where to install the valve.

The work vehicle according to a second aspect is the work vehicle according to the first aspect, wherein the control valve is disposed on the front frame.

Consequently, the control valve can be disposed on the front frame even when there is little room below the driver's seat.

The work vehicle according to a third aspect is the work vehicle according to the first aspect, further comprising a steering valve. The steering valve adjusts the flow of fluid supplied to the hydraulic actuator, on the basis of the pilot pressure inputted from the control valve. The control valve controls the flow of fluid supplied from the steering valve to the hydraulic actuator by adjusting the pilot pressure.

This affords greater latitude in choosing where to install the control valve for adjusting the pilot pressure.

Also, with the above configuration, the pilot pressure is adjusted by an operation performed by the operator, the amount of fluid supplied from the steering valve to the hydraulic actuator is controlled, and the steering angle of the front frame with respect to the rear frame is changed.

The work vehicle according to a fourth aspect is the work vehicle according to the first aspect, wherein the control valve is disposed on the front frame. The control valve has a spool as a valve body that can move along the axial direction, and controls the flow of fluid according to the movement of the spool in its axial direction.

Having the first link mechanism disposed in the horizontal direction makes it possible to transmit the operation of the joystick lever to the front frame. Therefore, a spool valve can be used as the control valve to which the operation of the joystick lever is transmitted.

The work vehicle according to a fifth aspect is the work vehicle according to the first aspect, and further comprising a force imparting component. The force imparting component has an electric motor as its drive source, and imparts an assisting force or a counterforce to the operation of the joystick lever.

Here, the force required to operate the joystick lever is determined mainly by the control valve, but the operation feel can be varied to suit the work vehicle situation by imparting an assisting force or a counterforce to the operation of the joystick lever with the force imparting component.

In operating the control valve by operating the joystick lever, an assist force can be imparted to the operation of the joystick lever to make it easier for the operator to operate. For example, when a spool valve is used as the control valve, since the first link mechanism is also interposed, it is assumed that the operation of the joystick lever will be heavier, but imparting an assisting force will make the joystick lever easier to operate.

When moving the work vehicle is moved at low speed, for example, it is possible to improve operability by imparting an assisting force to the joystick lever to reduce the force required to operate the joystick lever. On the other hand, when the travel speed of the work vehicle changes from a low speed to a high speed, traveling stability can be improved by imparting a counterforce to the joystick lever and increasing the force required to operate the joystick lever.

Appropriately varying the force required to operate the joystick lever according to the traveling state of the work vehicle gives the operator a better operational feel.

The work vehicle according to a sixth aspect is the work vehicle according to the fifth aspect, further comprising a connecting portion. The connecting portion connects the joystick lever and the first link mechanism. The force imparting component further has a transmission mechanism that transmits an assisting force or a counterforce to the connecting portion.

Consequently, the force of the force imparting component can be transmitted to the connecting portion that connects the joystick lever and the control valve, and the force required to operate the joystick lever can be varied.

The work vehicle according to a seventh aspect is the work vehicle according to the fifth aspect, further comprising a torque sensor and a controller. The torque sensor senses the torque generated by the operation of the joystick lever. The controller controls the electric motor on the basis of the value sensed by the torque sensor.

Consequently, a force can be imparted according to the torque applied by the operator to the joystick lever. For example, the amount of force imparted can be controlled so that the assisting force imparted by the force imparting component is higher when the torque applied to the joystick lever by the operator is high, and the assisting force is lower when the torque is low.

The work vehicle according to an eighth aspect is the work vehicle according to the fifth aspect, wherein the first link mechanism has an arm member, a rotation member, a first rod member, and a second rod member. The arm member is linked to the joystick lever and rotates along with the rotation of the joystick lever. The rotation member is disposed rotatably and coaxially with the center of articulation. The first rod member links the arm member and the rotation member. The second rod member links the rotation member and the control valve.

This first link mechanism allows the operation of the joystick lever provided to the rear frame to be transmitted to the control valve disposed on the front frame.

The work vehicle according to a ninth aspect is the work vehicle according to the first aspect, wherein the control valve has a first input member, a second input member, and a biasing component. The first input member is linked to the joystick lever via the first link mechanism and is displaced according to how much the joystick lever is operated. The second input member is fixed to the front frame. The biasing component biases the first input member so as to be in a neutral position in which the amount of displacement of the first input member with respect to the second input member is zero. The control valve is disposed so that the first input member and the second input member run in the vertical direction at the center of the articulation or the front frame. The control valve controls the flow of fluid supplied to the hydraulic actuator according to the amount of displacement of the first input member with respect to the second input member. The joystick lever is operated against the biasing force of the biasing component.

Consequently, the control valve (called a rotary valve) can be disposed in the center of the articulation or the front frame even when there is little room under the driver's seat.

Also, with the above configuration, after the joystick lever is operated, the steering angle changes following the joystick lever, and when the amount of operation of the joystick lever matches up with the steering angle, the control valve is in the neutral position.

Also, the control valve is provided with the biasing component, and the operator operates the joystick lever with an operation force that goes against the biasing force of the biasing component. An assisting force or a counterforce can be imparted to the operation against this biasing force.

The work vehicle according to a tenth aspect is the work vehicle according to the first aspect, further comprising a second link mechanism. The control valve has a first input member, a second input member, and a biasing component. The first input member is linked to the joystick lever via the first link mechanism and is displaced according to how much the joystick lever is operated. The second input member changes according to the steering angle. The biasing component biases the first input member so as to be in a neutral position in which the amount of displacement of the first input member with respect to the second input member is zero. A second link mechanism links the front frame and the second input member and transmits the change in steering angle to the second input member. The control valve is disposed so that the first input member and the second input member run in the vertical direction at the center of the articulation, and controls the flow of fluid supplied to the hydraulic actuator according to the amount of displacement of the first input member with respect to the second input member. The joystick lever is operated against the biasing force of the biasing component.

Consequently, the control valve (called a rotary valve) can be disposed in the center of the articulation even when there is little room under the driver's seat.

Also, with the above configuration, after the joystick lever is operated, the steering angle changes following the joystick lever, and when the amount of operation of the joystick lever matches up with the steering angle, the control valve is in the neutral position.

Advantageous Effects

The present invention provides a work vehicle with which there is greater latitude in choosing where to install the valve.

BRIEF DESCRIPTION OF DRAWINGS

FIG. 14A is a simplified view of the pilot valve in FIG. 11, FIG. 14B is a graph of the relation between lever counterforce and vehicle body-lever deviation angle in the pilot valve in FIG. 14A, FIG. 14C consists of cross sections along the C-C', D-D', E-E', and F-F' lines in FIG. 14A when the deviation angle α is zero, FIG. 14D consists of cross sections along the C-C', D-D', E-E', and F-F' lines in FIG. 14A when the deviation angle α is θ2, and FIG. 14E consists of cross sections along the C-C', D-D', E-E', and F-F' lines in FIG. 14A when the deviation angle α is θ3;

DESCRIPTION OF EMBODIMENTS

A wheel loader in an embodiment of the present invention will now be described through reference to the drawings.

Embodiment 1

1. Configuration
1-1. Overview of Wheel Loader Configuration

Figure 1:
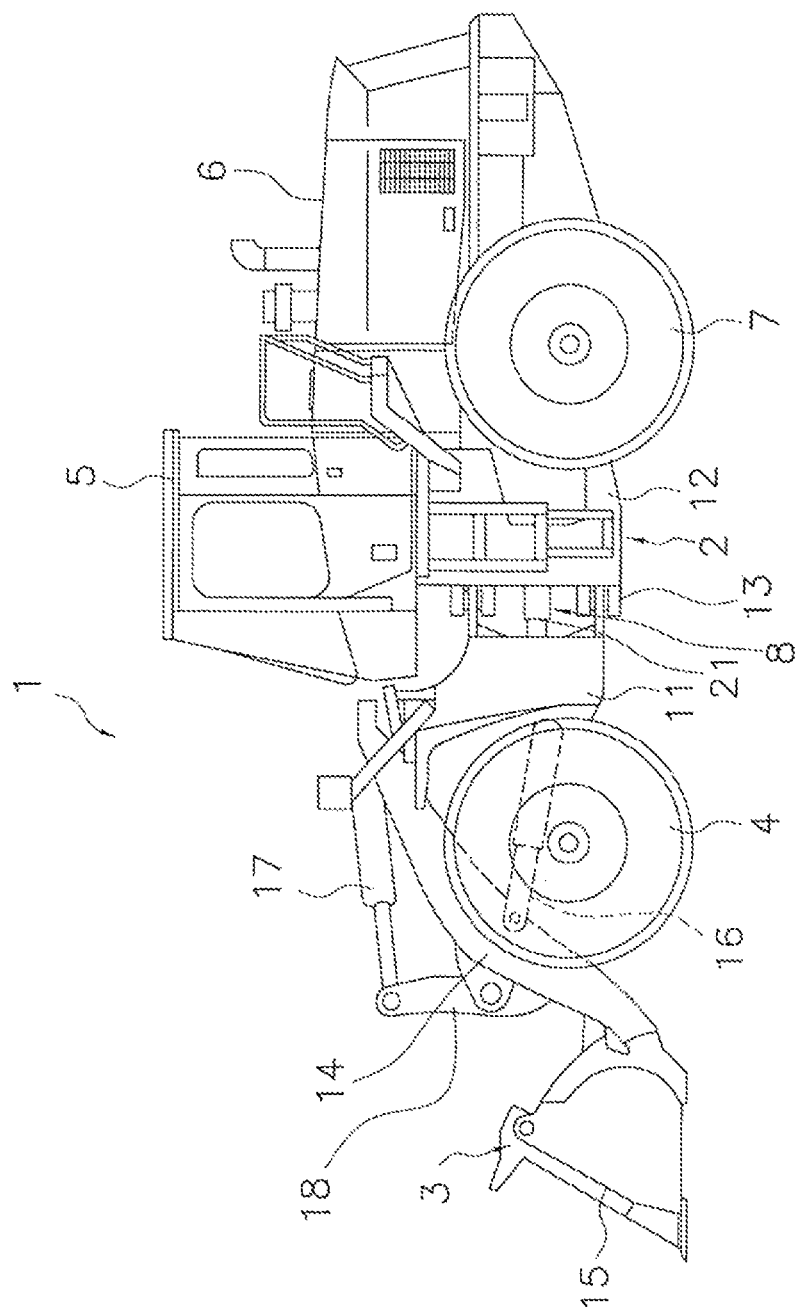
FIG. 1 is a side view of a wheel loader in an embodiment pertaining to the present invention.

FIG. 1 is a simplified diagram of the configuration of a wheel loader 1 in this embodiment. The wheel loader 1 in this embodiment comprises a body frame 2, a work implement 3, a pair of front tires 4, a cab 5, an engine compartment 6, a pair of rear tires 7, and a steering operation device 8.

The wheel loader 1 uses the work implement 3 to load earth and perform other such work.

The body frame 2 is what is called an articulated type, and has a front frame 11, a rear frame 12, and a connecting shaft 13. The front frame 11 is disposed ahead of the rear frame 12. The front tires 4 are mounted on the left and right sides of the front frame 11. The rear tires 7 are mounted on the left and right sides of the rear frame 12.

Figure 2:
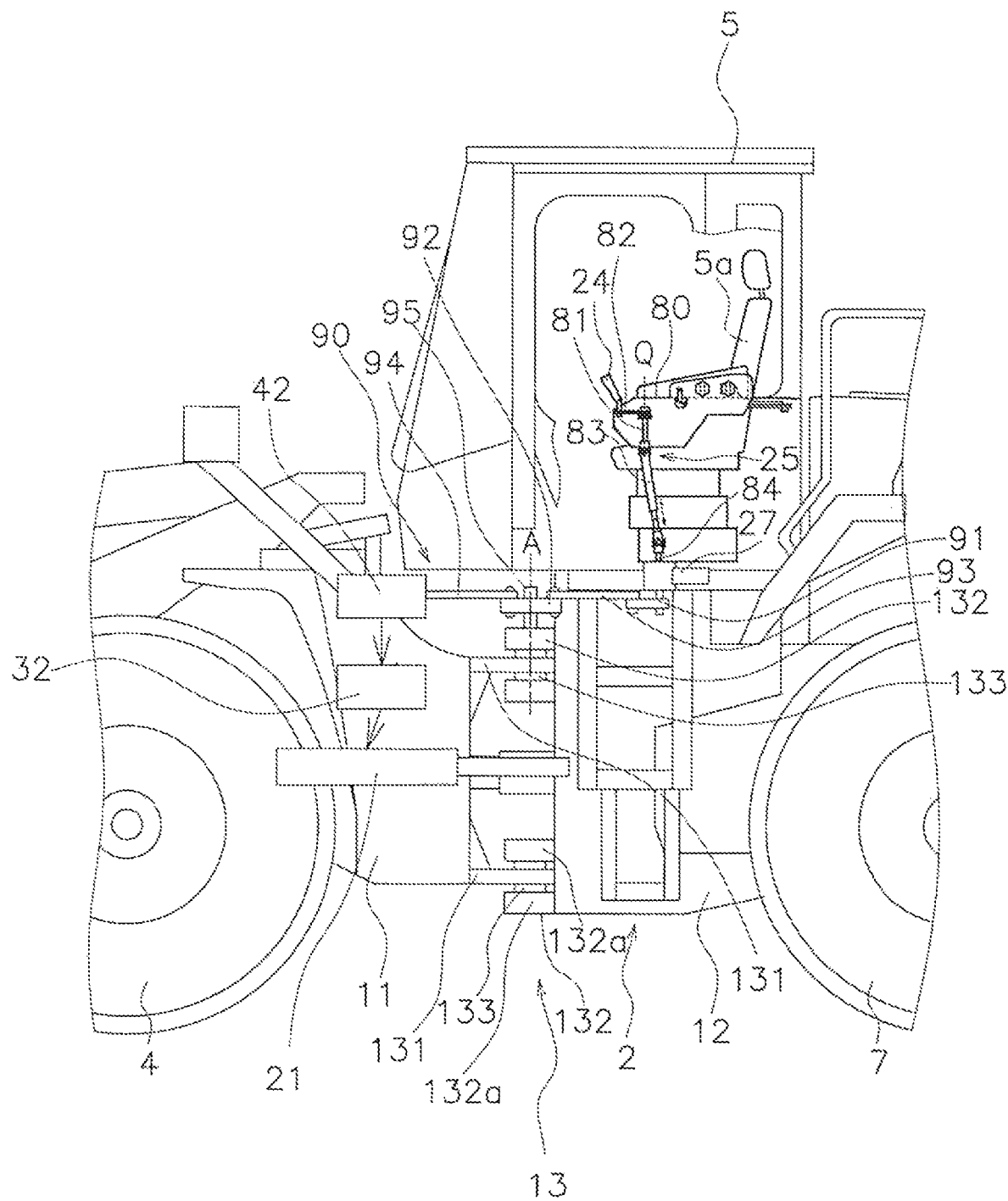
FIG. 2 is a detail view of the part of the wheel loader in FIG. 1 near the cab and a connecting shaft.

The connecting shaft 13 is provided in the center in the vehicle width direction, and links the front frame 11 and the rear frame 12 so that they can pivot relative to each other. FIG. 2 is a detail view of the area near the cab 5 and the connecting shaft 13.

As shown in FIG. 2, the connecting shaft 13 has a pair of upper and lower front brackets 131, a pair of upper and lower rear brackets 132, and two center pins 133 disposed above and below. Each of the front brackets 131 is fixed to the front frame 11 and is provided so as to protrude horizontally from the rear portion of the front frame 11 toward the rear frame 12. The rear brackets 132 each have a pair of bracket members 132a disposed above and below the front bracket 131. The bracket members 132a of the rear brackets 132 are provided so as to protrude horizontally from the front portion of the rear brackets 132 toward the front frame 11. The center pins 133 are disposed vertically, and rotatably link the bracket members 132a and the front brackets 131 disposed in between bracket members 132a. As shown in FIG. 2, a set of a front bracket 131, a rear bracket 132, and a center pin 133 is disposed vertically.

The work implement 3 is driven by working fluid from a work implement pump (not shown). As shown in FIG. 1, the work implement 3 has a boom 14, a bucket 15, a lift cylinder 16, and a bucket cylinder 17. The boom 14 is mounted on the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. Expansion and contraction of the lift cylinder 16 causes the boom 14 to pivot up and down. One end of the bucket cylinder 17 is attached to the front frame 11, and the other end of the bucket cylinder 17 is attached to the bucket 15 via a bell crank 18. As the bucket cylinder 17 expands and contracts, the bucket 15 pivots up and down.

The cab 5 is installed on the rear frame 12, and in its interior are disposed a steering wheel or a joystick lever 24 (see FIG. 2) for a steering operation, a lever for operating the work implement 3, various display devices, and the like. The engine compartment 6 is disposed on the rear frame 12 to the rear of the cab 5, and houses an engine.

The steering operation device 8 will be described in detail below. The steering operation device 8 has steering cylinders 21 and 22, and when the flow of fluid supplied to the steering cylinders 21 and 22 is changed, this changes the steering angle of the front frame 11 with respect to the rear frame 12, thereby changing the traveling direction of the wheel loader 1.

1-2. Steering Operation Device

Figure 3:
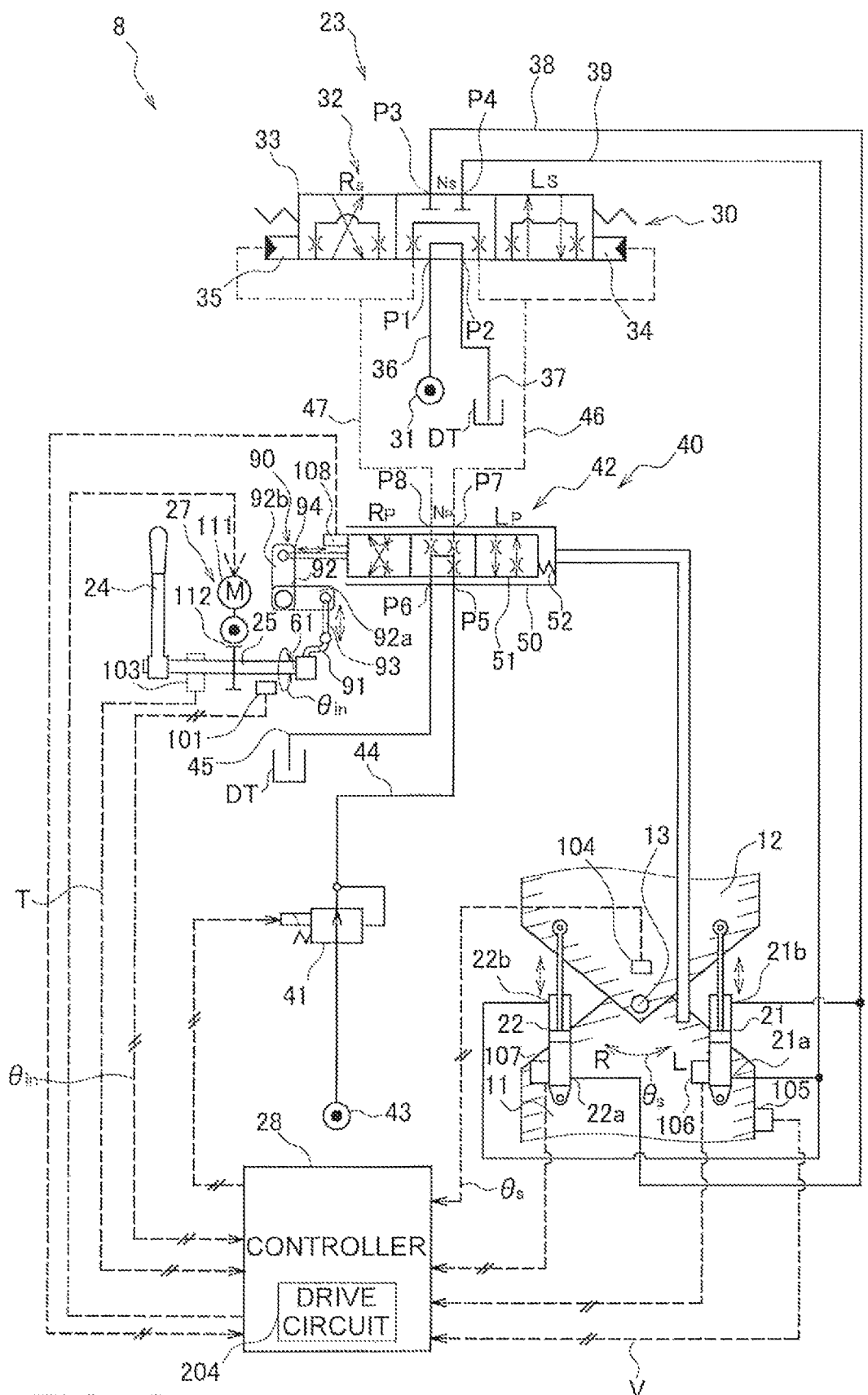
FIG. 3 is a hydraulic circuit diagram of the configuration of the steering operation device of the wheel loader in FIG. 1.

FIG. 3 is a hydraulic circuit diagram of the configuration of the steering operation device 8. The steering operation device 8 in this embodiment mainly has the pair of steering cylinders 21 and 22, a steering hydraulic circuit 23, the joystick lever 24, a connecting portion 25, a link mechanism 90, a force imparting component 27, and a controller 28.

1-2-1. Steering Cylinders

The steering cylinders 21 and 22 are driven by hydraulic pressure. The steering cylinders 21 and 22 are disposed side by side on the left and right sides in the vehicle width direction, with the connecting shaft 13 in between. The steering cylinder 21 is disposed on the left side of the connecting shaft 13 (see FIG. 1). The steering cylinder 22 is disposed on the right side of the connecting shaft 13. One end of each of the steering cylinders 21 and 22 is attached to the front frame 11, and the other end is attached to the rear frame 12.

The steering cylinder 21 is provided with an extension port 21a and a contraction port 21b, and the steering cylinder 22 is provided with an extension port 22a and a contraction port 22b.

When fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22, the steering cylinder 21 extends and the steering cylinder 22 contracts. This changes the steering angle θs, and the vehicle turns to the right. When fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22, the steering cylinder 21 contracts and the steering cylinder 22 extends. This changes the steering angle θs, and the vehicle turns to the left.

A steering angle sensor 104 that senses the steering angle θs is provided near the connecting shaft 13 disposed between the steering cylinders 21 and 22. The steering angle sensor 104 is constituted by a potentiometer, for example, and the sensed steering angle θs is sent to the controller 28 as a sensing signal.

The steering cylinder 21 is provided with a cylinder stroke sensor 106 for sensing the stroke of the cylinder, and the steering cylinder 22 is provided with a cylinder stroke sensor 107 for sensing the stroke of that cylinder. The sensing values of the cylinder stroke sensors 106 and 107 may be sent to the controller 28 to find the steering angle θs.

1-2-2. Steering Hydraulic Circuit

The steering hydraulic circuit 23 is a hydraulic circuit for adjusting the flow of fluid supplied to the steering cylinders 21 and 22. The steering hydraulic circuit 23 has a main hydraulic circuit 30 and a pilot hydraulic circuit 40.

Main Hydraulic Path

The main hydraulic circuit 30 is a circuit that supplies fluid from a main hydraulic pressure source 31 to the steering cylinders 21 and 22, and has a steering valve 32. The main hydraulic pressure source 31 is made up of a hydraulic pump, a relief valve, and the like.

The steering valve 32 is a spool type of valve, and is a flow control valve that adjusts the flow of fluid supplied to the steering cylinders 21 and 22 according to the inputted pilot pressure. The steering valve 32 has a main pump port P1, a main drain port P2, a first steering port P3, and a second steering port P4. The main pump port P1 is connected to the main hydraulic pressure source 31 via a main hydraulic line 36. The main drain port P2 is connected to a drain tank DT that collects fluid via the main drain line 37. The first steering port P3 is connected to the contraction port 21b of the steering cylinder 21 and the extension port 22a of the steering cylinder 22 via a first steering line 38. The second steering port P4 is connected to the extension port 21a of the steering cylinder 21 and the contraction port 22b of the steering cylinder 22 via a second steering line 39.

The steering valve 32 has a valve body 33 (spool) that can move between a neutral position Ns, a left steering position Ls, and a right steering position Rs. When the valve body 33 is disposed in the neutral position Ns, the main pump port P1 and the main drain port P2 are communicating with each other. In this case, the first steering port P3 and the second steering port P4 are not in communication with any port. When the valve body 33 is disposed in the left steering position Ls, the main pump port P1 and the first steering port P3 are communicating with each other, and the main drain port P2 and the second steering port P4 are communicating with each other. When the valve body 33 is disposed in the right steering position Rs, the main pump port P1 and the second steering port P4 are communicating with each other, and the main drain port P2 and the first steering port P3 are communicating with each other.

The steering valve 32 has a first pilot chamber 34 and a second pilot chamber 35. When pilot pressure is not being supplied to the first pilot chamber 34 or the second pilot chamber 35, and when the same pilot pressure is being supplied to the first pilot chamber 34 and the second pilot chamber 35, the valve body 33 is located in the neutral position Ns. In a state in which the pilot pressure is being supplied only to the first pilot chamber 34, the valve body 33 is located in the left steering position Ls. In a state in which the pilot pressure is supplied only to the second pilot chamber 35, the valve body 33 is located in the right steering position Rs. When the valve body 33 is located in the left steering position Ls and the right steering position Rs, the steering valve 32 changes the opening surface area through which the fluid from the main hydraulic pressure source 31 passes, according to the supplied pilot pressure. Accordingly, the steering valve 32 controls the flow of fluid supplied to the steering cylinder 21 or the steering cylinder 22 according to the pilot pressure.

(b) Pilot Hydraulic Circuit

The pilot hydraulic circuit 40 is a circuit for supplying fluid from a pilot hydraulic pressure source 43 to the first pilot chamber 34 and the second pilot chamber 35 of the steering valve 32.

The pilot hydraulic circuit 40 has a variable pressure reducer 41 and a pilot valve 42.

(i) Variable Pressure Reducer 41

The variable pressure reducer 41 reduces and adjusts the hydraulic pressure sent from the pilot hydraulic pressure source 43 to the pilot valve 42. The variable pressure reducer 41 has a built-in electromagnetic pressure reducing valve, and receives a command signal from the controller 28 to control the hydraulic pressure.

(ii) Pilot Valve

The pilot valve 42 is a spool type of valve that adjusts the pilot pressure inputted from the pilot hydraulic pressure source 43 to the steering valve 32.

Overview of Pilot Valve Configuration

The rotary pilot valve 42 has a tubular sleeve 50, a spool 51 that can move in the axial direction inside the sleeve 50, and a biasing spring 52. The sleeve 30 has pilot pump port P5, a pilot drain port P6, a first pilot port P7, and a second pilot port P8. The pilot pump port P5 is connected to the variable pressure reducer 41 via the pilot hydraulic line 44, and the variable pressure reducer 41 is connected to the pilot hydraulic pressure source 43. The pilot drain port P6 is connected to the drain tank DT that collects fluid via a pilot drain line 45. The first pilot port P7 is connected to the first pilot chamber 34 of the steering valve 32 via the first pilot line 46. The second pilot port P8 is connected to the second pilot chamber 35 of the steering valve 32 via the second pilot line 47.

The spool 51 can move between the neutral position Np, the left pilot position Lp, and the right pilot position Rp inside the sleeve 50.

The biasing spring 52 biases the spool 51 to locate it in the neutral position Np with respect to the sleeve 50.

When the spool 51 is in the neutral position Np with respect to the sleeve 50, the pilot pump port P5, the pilot drain port P6, the first pilot port P7, and the second pilot port P8 communicate with each other. When the spool 51 is disposed in the left pilot position Lp with respect to the sleeve 50, the pilot pump port P5 communicates with the first pilot port P7, and the pilot drain port P6 communicates with the second pilot port P8. Also, when the spool 51 is disposed in the right pilot position Rp with respect to the sleeve 50, the pilot pump port P5 communicates with the second pilot port P8, and the pilot drain port P6 communicates with the first pilot port P7.

Also, the pilot valve 42 is provided with a spool position sensor 108 for sensing the position of the spool 51. The value sensed by the spool position sensor 108 is transmitted to the controller 28.

1-2-3. Joystick Lever, Connecting Portion

Figure 4:
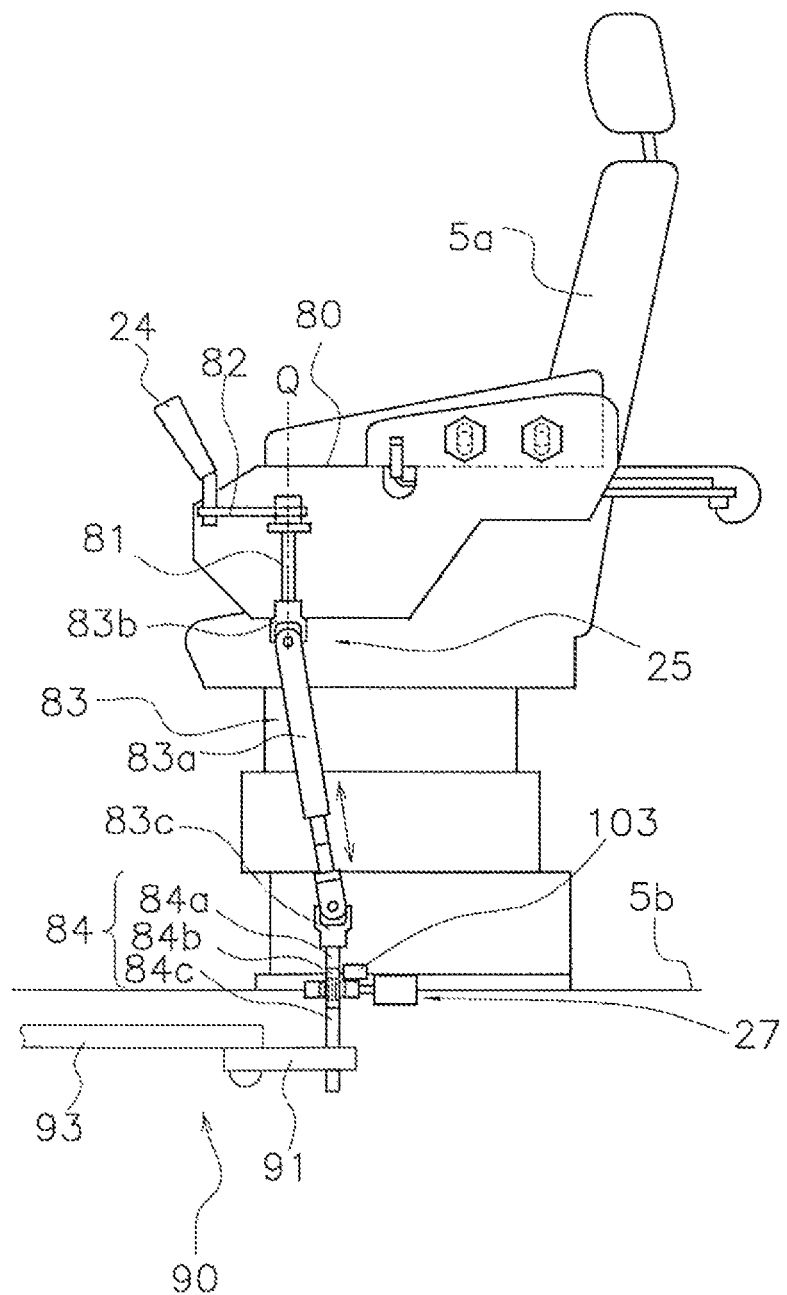
FIG. 4 is a diagram of the internal configuration of the cab in FIG. 3.

FIG. 4 shows the configuration inside the cab 5. A driver's seat 5a in which an operator sits is provided in the cab 5. A steering box 80 is disposed on the left side of the driver's seat 5a in the vehicle width direction.

The joystick lever 24 is disposed so as to protrude obliquely upward from the steering box 80 toward the front.

The connecting portion 25 connects the joystick lever 24 and a link mechanism 90 (discussed below). The connecting portion 25 mainly has a steering operation shaft 81, a connecting bar 82, a universal joint 83, and an output shaft 84.

The steering operation shaft 81 is disposed vertically and is supported by the steering box 80 so as to be rotatable around its center axis Q. The connecting bar 82 is disposed in the steering box 80 and connects the joystick lever 24 and the steering operation shaft 81.

The universal joint 83 connects the steering operation shaft 81 and the output shaft 84 disposed near the driver's seat 5a. The universal joint 83 has a telescoping central portion 83a and joint portions 83b and 83c disposed at the ends of the central portion 83a. The joint portion 83b is connected to the steering operation shaft 81. The joint portion 83c is connected to the output shaft 84.

The output shaft 84 outputs to the link mechanism 90 the operation of the joystick lever 24 that has been transmitted via the connecting bar 82 and the universal joint 83. The output shaft 84 extends to the lower side of the floor 5b of the cab 5. More precisely, the output shaft 84 is configured such that a lever-side shaft portion 84a, a torque input shaft portion 84b, and a link-side shaft portion 84c are linked in that order (see FIG. 6, discussed below). That is, one end of the lever-side shaft portion 84a is connected to the connecting bar 82, and the other end of the lever-side shaft portion 84a is connected to one end of the torque input shaft portion 84b. The other end of the torque input shaft portion 84b is connected to one end of the link-side shaft portion 84c, and the other end of the link-side shaft portion 84c is connected to the universal joint 83. An assisting force or a counterforce from the force imparting component 27 (discussed below) is inputted to the torque input shaft portion 84b.

Figure 5:
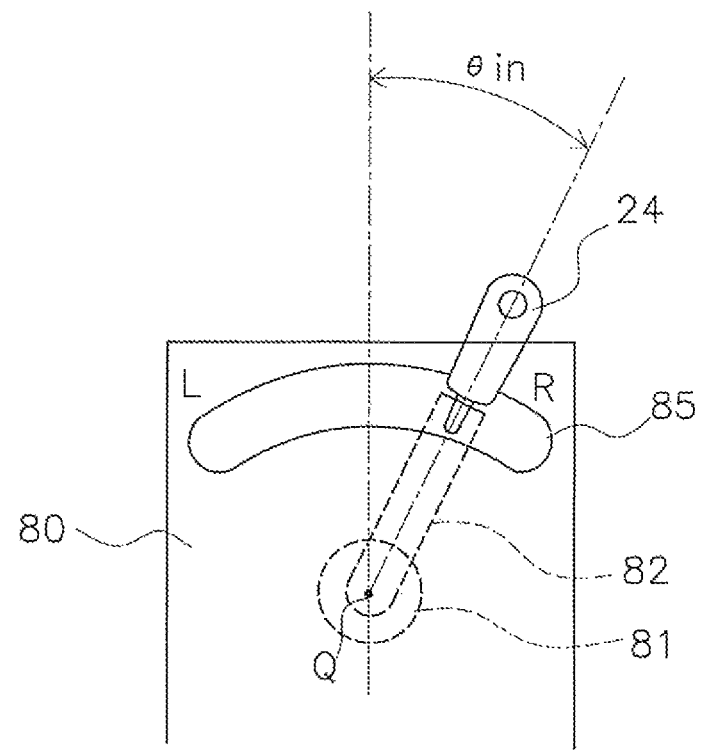
FIG. 5 is a top view of the joystick lever in FIG. 4.

FIG. 5 is a plan view of the area near the joystick lever 24 as viewed from above. As shown in FIG. 5, the joystick lever 24 is formed so as to protrude obliquely upward from an arc-shaped hole 85 formed in the upper face of the steering box 80. The joystick lever 24 can be turned horizontally around the steering operation shaft 81 (more precisely, the center axis Q). Also, an R mark is formed at the edge on the right end of the hole 85 of the steering box 80, and an L mark is formed at the edge on the left end.

For example, as shown in FIG. 5, when the operator rotates the joystick lever 24 from the center position to the right side by the rotation angle θin, the steering operation shaft 81 also rotates to the right by the angle θin. This rotation of the steering operation shaft 81 by the rotation angle θin is transmitted through the universal joint 83 to the link mechanism 90 (discussed below), the spool 51 of the pilot valve 42 moves to the right pilot position Rp, and the articulation to the right begins. The same applies when the joystick lever 24 is rotated to the left. The rotation angle θin of the joystick lever 24 is sensed by a first rotation angle sensor 101 constituted by a rotary sensor, for example.

When no assisting force or counterforce is inputted by the force imparting component 27, the operator has to operate the joystick lever 24 against the biasing spring 52 of the pilot valve 42.

1-2-4. Force Imparting Component

Figure 6:
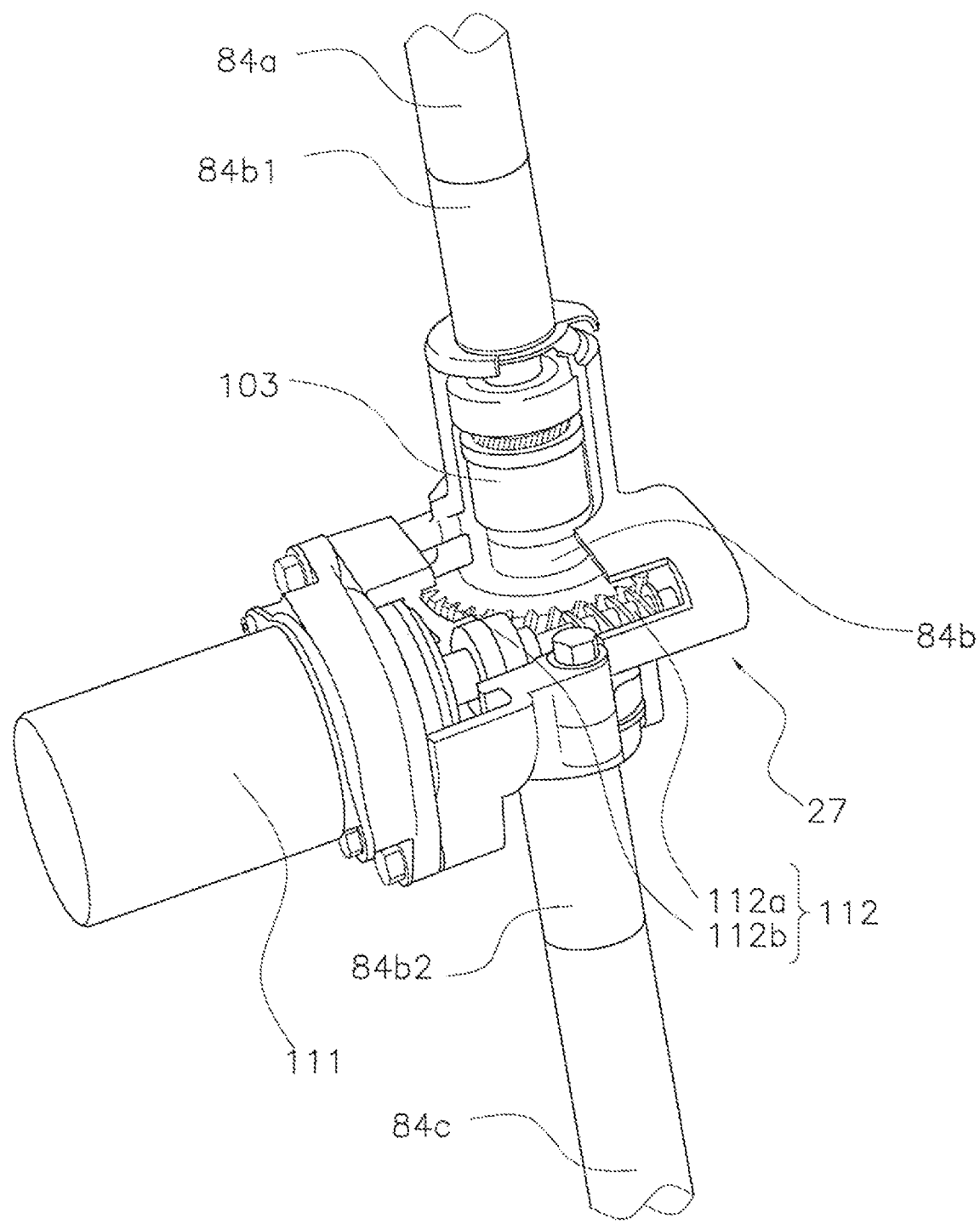
FIG. 6 is an oblique view of the configuration of the force imparting component in FIG. 3.

FIG. 6 is an oblique view of the force imparting component 27.

The force imparting component 27 imparts an assisting force or a counterforce to the operation of the joystick lever 24. The force imparting component 27 has an electric motor 111 and a worm gear 112. The worm gear 112 has a cylindrical worm 112a and a worm wheel 112b. The worm wheel 112b is provided around the input shaft 84b described above, and meshes with the cylindrical worm 112a. The output shaft of the electric motor 111 is connected to the cylindrical worm 112a, and rotates the cylindrical worm 112a around its center axis. The electric motor 111 is driven on the basis of a command from a drive circuit 204 provided to the controller 28.

A first end 84b1 of the input shaft 84b is connected to the lever side shaft 84a, and the second end 84b2 is connected to the valve side shaft 84c.

When the electric motor 111 is driven, the cylindrical worm 112a rotates, this rotation causes the worm wheel 112b to rotate, and a rotational force is also generated at the input shaft 84b fixed to the worm wheel 112b. A rotational force can be applied to the input shaft 84b in the directions of both left rotation and right rotation by changing the rotation direction of the cylindrical worm 112a.

For example, when the joystick lever 24 is rotated to the right, a force is applied to the input shaft 84b in the clockwise direction, thereby imparting an assisting force to the operation of the joystick lever 24. Also, when the joystick lever 24 is rotated to the right, a force is applied to the input shaft 84b in the counterclockwise direction, thereby imparting a counterforce to the operation of the joystick lever 24.

A torque sensor 103 is provided to the input shaft 84b. The torque sensor 103 senses torque generated at the input shaft 84b when the operator applies force to the joystick lever 24. The torque sensor 103 in this embodiment senses the rotation direction of the torque input shaft portion 84b and the torque generated at the torque input shaft portion 84b by using a coil to sense twisting of the torsion bar, for example. The sensed rotation direction and torque T are outputted to the controller 28 as a steering torque signal.

1-2-5. Link Mechanism

Figure 7:
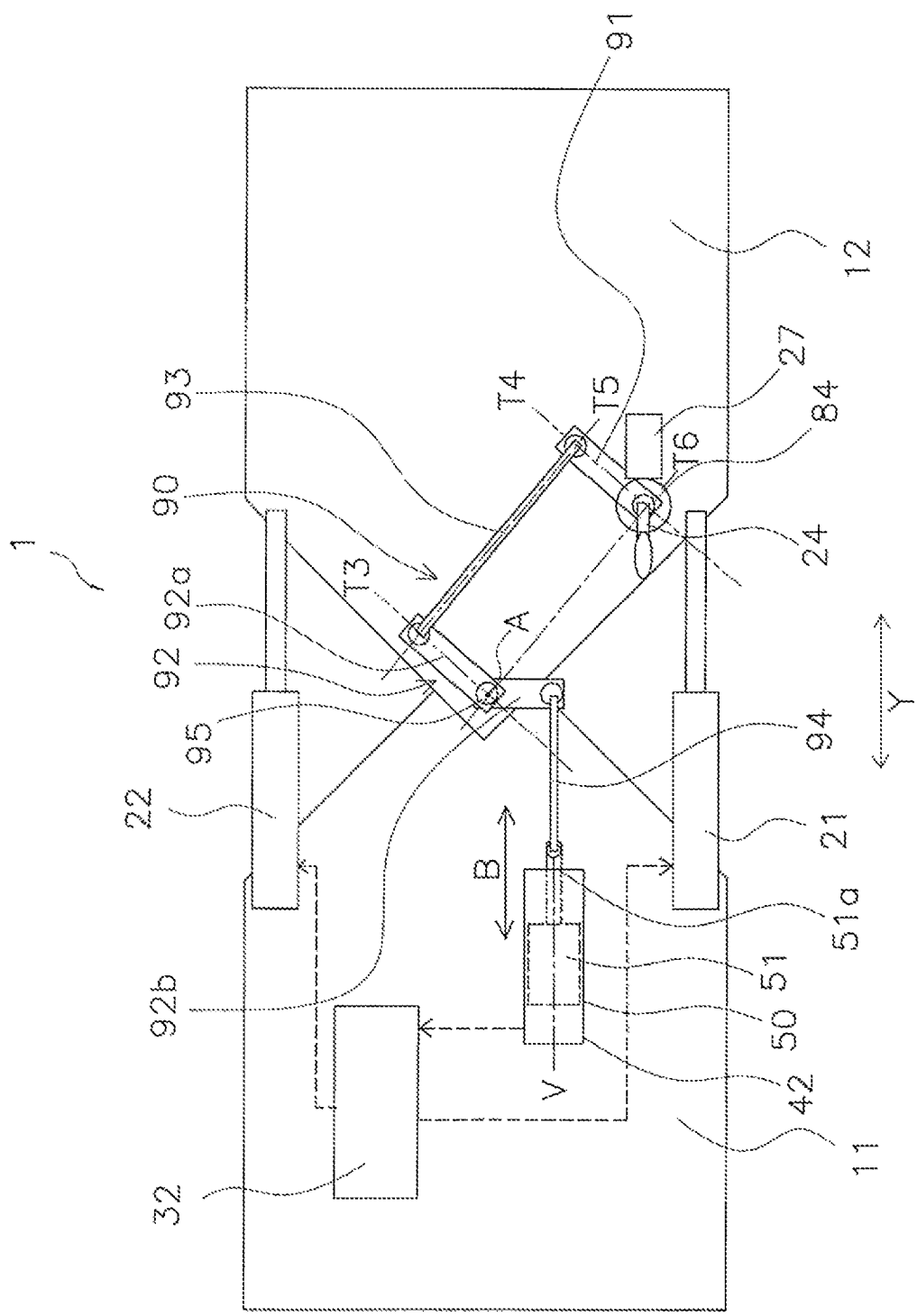
FIG. 7 is a simplified plan view of the configuration of a link of the wheel loader in FIG. 1.

The link mechanism 90 transfers the operation in the rotation direction produced by the joystick lever 24 to a rotation member 92 that is a specific distance away from the joystick lever 24 in a plan view, converts this into a linear operation, and transmits the result to the pilot valve 42. As shown in FIG. 2, the link mechanism 90 is disposed below the cab 5, and is formed to run horizontally so as to link the pilot valve 42 to the connecting portion 25 that is connected to the joystick lever 24. FIG. 7 is a simplified plan view illustrating the configuration of the link mechanism 90. As shown in FIG. 7, the link mechanism 90 has a first arm member 91, the rotation member 92, a first rod member 93, and a second rod member 94.

As shown in FIGS. 4 and 7, the first arm member 91 is fixed to the lower end of the output shaft 84. The arm member 91 is disposed running horizontally from the lower end of the output shaft 84.

The rotation member 92 is rotatably supported by a support shaft 95 disposed on the connecting shaft 13. The support shaft 95 is disposed so that its axial direction is runs along the articulation center A, and is fixed to a bracket member 132a of the rear bracket 132. That is, since the support shaft 95 is fixed to the rear frame 12, the support shaft 95 does not rotate with the front frame 11 when articulation is performed.

More precisely, as shown in FIG. 7, the rotation member 92 has a second arm member 92a and a third arm member 92b. One end of the second arm member 92a is rotatably supported by the support shaft 95. One end of the third arm member 92b is rotatably supported by the support shaft 95. The second arm member 92a and the third arm member 92b are formed protruding horizontally from the support shaft 95. Also, the second arm member 92a and the third arm member 92b are fixed to each other at a specific angle. Therefore, the second arm member 92a and the third arm member 92b are able to rotate with respect to the support shaft 95 while maintaining a specific angle.

The first rod member 93 is a rod-like member, and links the distal end of the first arm member 91 to the distal end of the second arm member 92a. One end of the first rod member 93 is rotatably linked to the distal end of the first arm member 91, and the other end of the first rod member 93 is rotatably linked to the distal end of the second arm member 92a.

Here, a straight line connecting the support shaft 95 and the connected portion between the first rod member 93 and the second arm member 92a is termed T3, and a straight line connecting output shaft 84 and the connected portion between the first rod member 93 and the first arm member 91 is termed T4. A straight line connecting the connected portion between the first rod member 93 and the first arm member 91 with the connected portion between the first rod member 93 and the second arm member 92a is termed T5, and a straight line connecting the output shaft 84 and the support shaft 95 is termed T6. The components are disposed so that the straight line T3 and the straight line T4 are parallel, and the straight line T5 and the straight line T6 are parallel, forming a parallel link as a whole.

The second rod member 94 links the distal end of the third arm member 92b and the pilot valve 42. One end of the second rod member 94 is rotatably linked to the distal end of the third arm member 92b. The other end of the second rod member 94 is rotatably linked to the spool 51 of the pilot valve 42. More precisely, the other end of the second rod member 94 is rotatably linked to a connecting member 51a formed at the rear portion of the spool 51.

The pilot valve 42 here is fixed to the front frame 11 so that the movement direction B of the spool 51 (the axis V direction) will coincide with the longitudinal direction of the vehicle body (indicated by the arrow Y in the drawing) in a state in which the front frame 11 is not inclined with respect to the rear frame 12.

With this link mechanism 90, the rotational operation of the joystick lever 24 is transmitted to the pilot valve 42 fixed to the front frame 11.

1-2-6. Controller

The controller 28 has a drive circuit 204 for driving the electric motor 111. The controller 28 can impart an assisting force or counterforce to the operation of the joystick lever 24 by the operator on the basis of the torque T, the deviation angle α, and the speed V.

The controller 28 also controls the variable pressure reducer 41 as shown in FIG. 2 on the basis of the rotation angle θin, the rotation angle θs, and the vehicle speed V sensed by the vehicle speed sensor 105 shown in FIG. 2. Consequently, the original pilot pressure sent to the pilot valve 42 can be controlled so that there is no sudden change in the flow of fluid to the left and right steering cylinders 21 and 22. The variable pressure reducer 41 may be controlled on the basis of the vehicle speed V and the position of the spool 51 sensed by the spool position sensor 108, instead of using the rotation angle θin and the rotation angle θs.

Also, the control of the electric motor 111 and the variable pressure reducer 41 by the controller 28 may be performed by wire or wirelessly.

2. Operation

The articulation of the wheel loader 1 in this embodiment will be described below.

2-1. Articulation

FIGS. 8A to 8D are simplified diagrams illustrating the articulation of the wheel loader 1.

In this embodiment, for example, when the spool 51 is in the center position in the longitudinal direction inside the sleeve 50, the spool 51 is in the neutral position Np, and when the spool 51 is located at the front part in the longitudinal direction inside the sleeve 50, the spool 51 is in the right pilot position Rp, and when the spool 51 is located at the rear part in the longitudinal direction inside the sleeve 50, the spool 51 is in the left pilot position Lp.

Figure 8B:
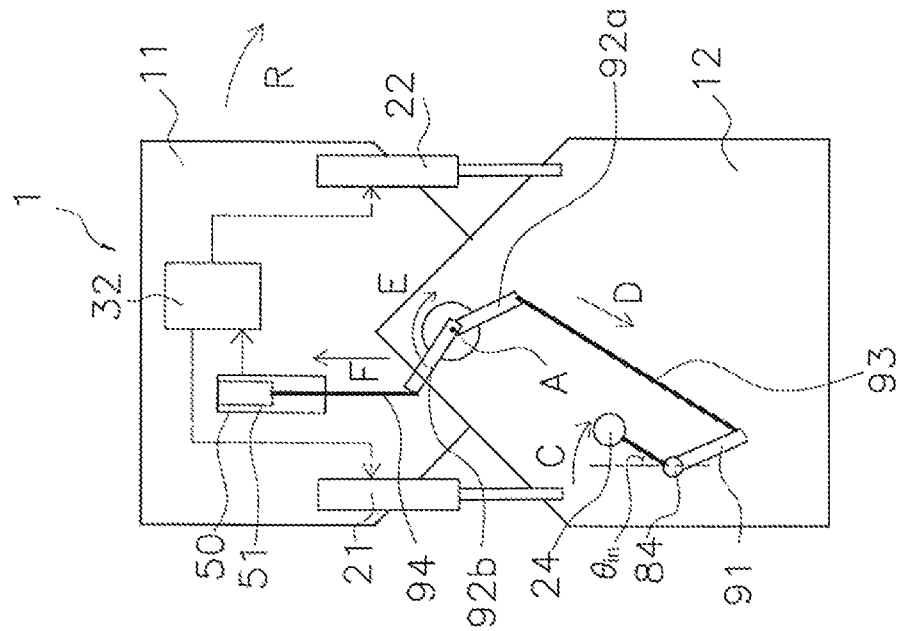
FIG. 8B is a diagram illustrating the steering operation of the wheel loader in Embodiment 1 of the present invention.
Figure 8A:
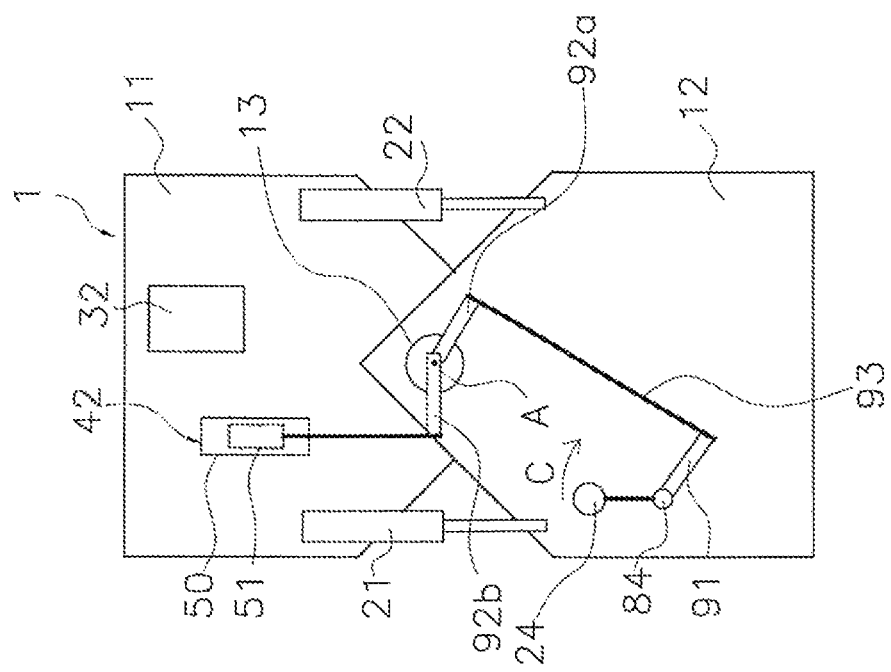
FIG. 8A is a diagram illustrating the steering operation of the wheel loader in Embodiment 1 of the present invention.

As shown in FIG. 8A, when the joystick lever 24 is in its center position, the output shaft 84 is in a specific initial position, and the rotation angle θin of the operation input shaft 84 is zero. As shown in FIG. 5, the rotation angle θin indicates the rotation angle from the center position of the joystick lever 24. The steering angle θs is also zero. In this embodiment, if we say that zero is a state of running along the longitudinal direction with respect to the rear frame 12, then the steering angle θs indicates the angle from that state.

At this point, the spool 51 is in the neutral position Np (see FIG. 3) with respect to the sleeve 50. In this case, the pilot pressures of the first pilot chamber 34 and the second pilot chamber 35 of the steering valve 32 are the same, and the valve body 33 of the steering valve 32 is also in the neutral position Ns. Accordingly, fluid is neither supplied to nor discharged from the left and right steering cylinders 21 and 22, and the steering angle θs is maintained at zero.

As shown in FIG. 8B, when the joystick lever 24 is operated to the right (see arrow C), this operating force is transmitted via the connecting bar 82, and the steering operation shaft 81 also rotates to the right when viewed from above (see arrow C). This rotation is transmitted to the output shaft 84 via the universal joint 83, and the output shaft 84 rotates to the right.

The first arm member 91 is also rotated to the right by the right rotation of the output shaft 84, and the first rod member 93 moves rearward as shown by the arrow D. Thus, operation of the joystick lever 24 in the rotational direction is converted into operation in the lengthwise direction of the first rod member 93 by the first arm member 91 and the first rod member 93. Then, as the first rod member 93 moves backward, the second arm member 92a rotates to the right (see the arrow E) around the support shaft 95 (articulation center A). When the second arm member 92 rotates to the right, the third arm member 92*b* fixed to the second arm member 92*a* also rotates to the right around the support shaft 95 (see the arrow E).

The rotation of the third arm member 92*b* to the right causes the second rod member 94 to move forward (in the direction of the arrow F) as shown in FIG. 8B. The forward movement of the second rod member 94 pushes the spool 51 forward (in the direction of the arrow F) in the sleeve 50 to the right pilot position Rp, pilot pressure is supplied to the second pilot port P8, and pilot pressure is supplied to the second pilot chamber 35.

Figure 8D:
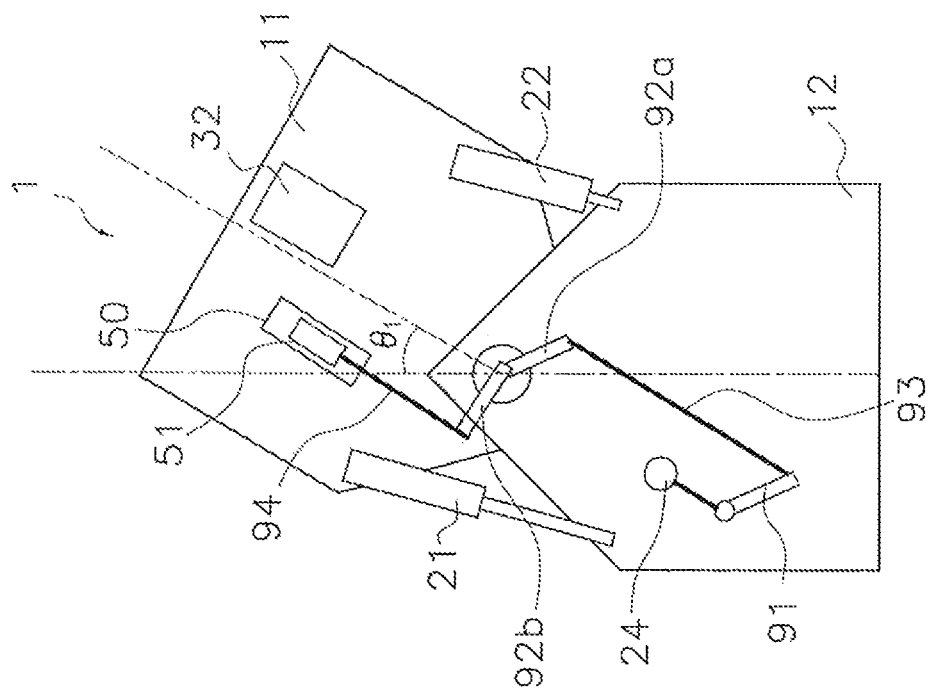
FIG. 8D is a diagram illustrating the steering operation of the wheel loader in Embodiment 1 of the present invention.
Figure 8C:
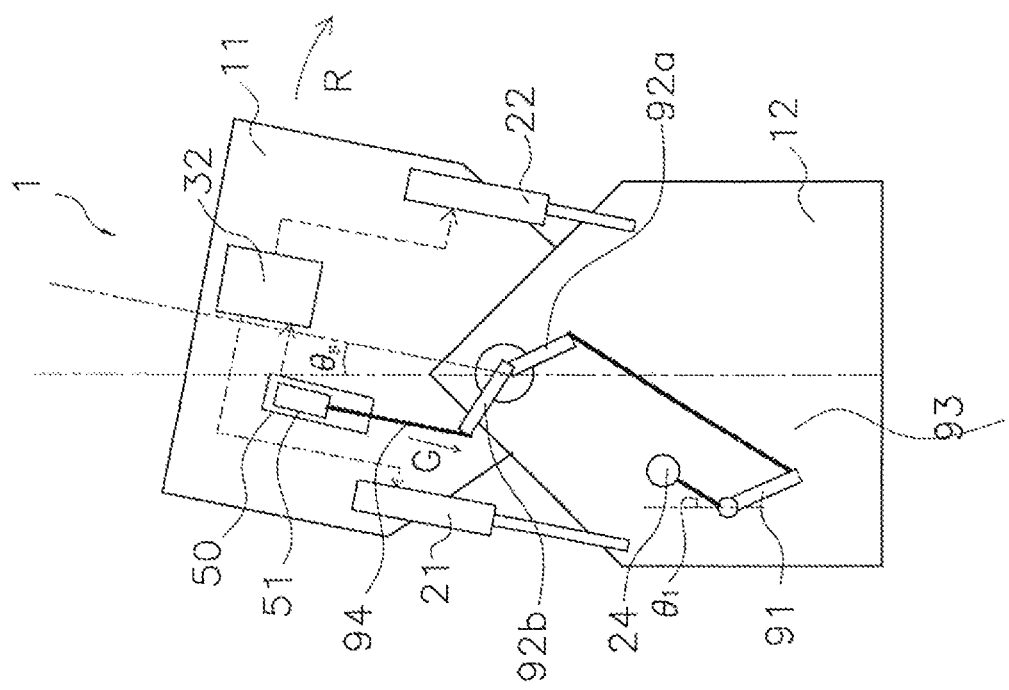
FIG. 8C is a diagram illustrating the steering operation of the wheel loader in Embodiment 1 of the present invention.

Consequently, the valve body 33 of the steering valve 32 moves to the right steering position Rs side, fluid is supplied to the extension port 21*a* of the steering cylinder 21 and the contraction port 22*b* of the steering cylinder 22, and fluid is discharged from the contraction port 21*b* of the steering cylinder 21 and the extension port 22*a* of the steering cylinder 22. Then, as shown in FIG. 8C, the steering angle θs gradually increases, and the front frame 11 is pointed toward the right with respect to the rear frame 12.

When the front frame 11 is thus inclined with respect to the rear frame 12 and the articulation is started, since the third arm member 92*b* and the second arm member 92*a* are fixed to the rear frame 12, the third arm member 92*b* and the second arm member 92*a* do not rotate along with the front frame 11.

Therefore, as the front frame 11 rotates, the spool 51 is pulled by the second rod member 94, and the spool 51 rearward moves in the sleeve 50 (the arrow G).

When the operator stops the joystick lever 24 at a specific rotation angle θ1, the link mechanism 90 also stops. On the other hand, since the steering angle θs is gradually increasing, the spool 51 also moves rearward. As shown in FIG. 8D, when the steering angle θs catches up with the rotation angle θ1, the spool 51 reaches the neutral position Np with respect to the sleeve 50. In this case, the pilot pressures of the first pilot chamber 34 and the second pilot chamber 35 of the steering valve 32 are the same, and the steering valve 32 is also in the neutral position Ns. Accordingly, fluid is neither supplied to nor discharged from the left and right steering cylinders 21 and 22, and the steering angle θs is maintained at the rotation angle θ1.

Thus, when the joystick lever 24 is rotated to the right side and stopped at a specific rotation angle θ1, the steering angle θs is also maintained at the same rotation angle θ1. As a result, the front frame 11 is kept facing to the right with respect to the rear frame 12 in the direction of the rotation angle θ1.

Figure 8E:
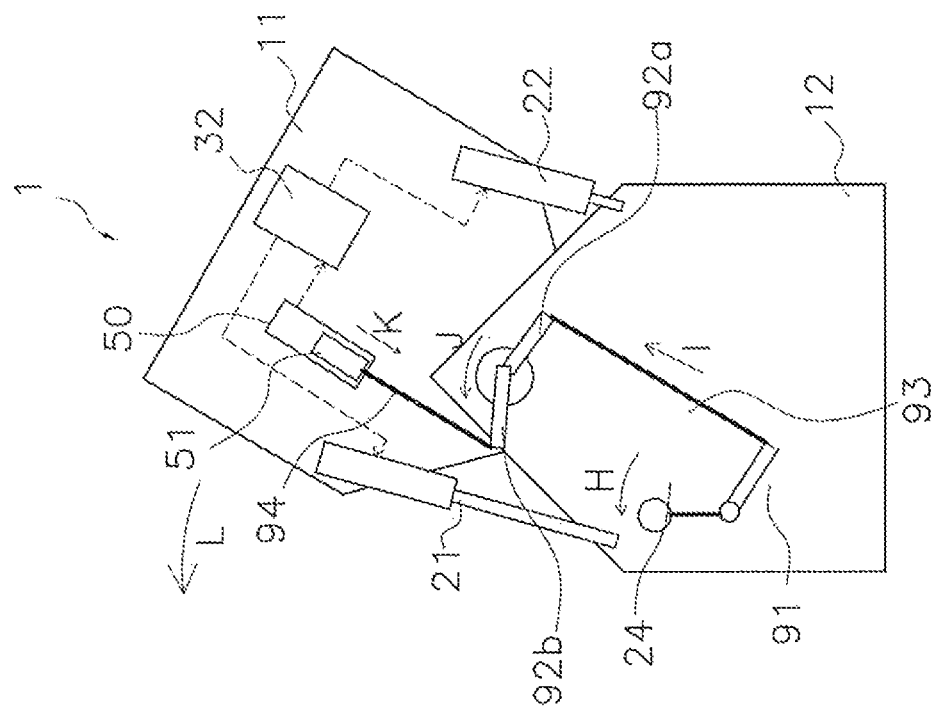
FIG. 8E is a diagram illustrating the steering operation of the wheel loader in Embodiment 1 of the present invention.

Next, when the operator returns the joystick lever 24 from the right side position toward the center position as shown in FIG. 8E from the state in FIG. 8D, the first arm member 91 rotates counterclockwise (see the arrow H) and the first rod member 93 moves forward (see the arrow I). Consequently, the second arm member 92*a* and the third arm member 92*b* rotate counterclockwise (see the arrow J), the second rod member 94 moves rearward, and the spool 51 also moves rearward with respect to the sleeve 50 (see the arrow K).

Then, in the pilot valve 42, the spool 51 moves to the left pilot position Lp side with respect to the sleeve 50, and pilot pressure is supplied to the first pilot port P7. Consequently, the valve body 33 of the steering valve 32 moves to the left steering position Ls, fluid is supplied to the contraction port 21*b* of the steering cylinder 21 and the extension port 22*a* of the steering cylinder 22, and fluid is discharged from the extension port 21*a* of the steering cylinder 21 and the contraction port 22*b* of the steering cylinder 22. As a result, the steering angle θs gradually decreases from the rotation angle θ1.

Here, since the third arm member 92*b* and the second arm member 92*a* are fixed to the rear frame 12, the third arm member 92*b* and the second arm member 92*a* do not rotate along with the front frame 11, so as the front frame 11 rotates, the third arm member 92*b* and the second arm member 92*a* are pushed by the second rod member 94, and the spool 51 moves forward in the sleeve 50. Thus, a change in the steering angle θs causes the spool 51 to move forward.

When the operator stops the joystick lever 24 in the center position, the steering angle θs also gradually decreases from the rotation angle θ1, and when the steering angle θs reaches zero, the spool 51 is in the neutral position Np with respect to the sleeve 50, as shown in FIG. 8A. In this case, the pilot pressures of the first pilot chamber 34 and the second pilot chamber 35 of the steering valve 32 are the same, and the steering valve 32 is also in the neutral position Ns. Therefore, fluid is neither supplied to nor discharged from the left and right steering cylinders 21 and 22, and the steering angle θs also returns to zero and is held there. As a result, the front frame 11 is returned to an orientation along the longitudinal direction with respect to the rear frame 12.

When the joystick lever 24 is rotated to the left side, everything is the same as above, so it will not be described again.

2-2. Control of Force Imparting Component

The control of the force imparting component 27 when the joystick lever 24 is operated as discussed above will now be described.

The wheel loader 1 in this embodiment controls the electric motor 111 so as to impart an assisting force or a counterforce on the basis of the sensed torque or the like, based on the assist information stored in the controller 28.

Operation with the joystick lever 24 is performed as above, but the controller 28 controls the electric motor 111 so as to impart an assisting force or a counterforce to the operation of the joystick lever 24 on the basis of the signal sensed by the torque sensor 103.

Figure 9:
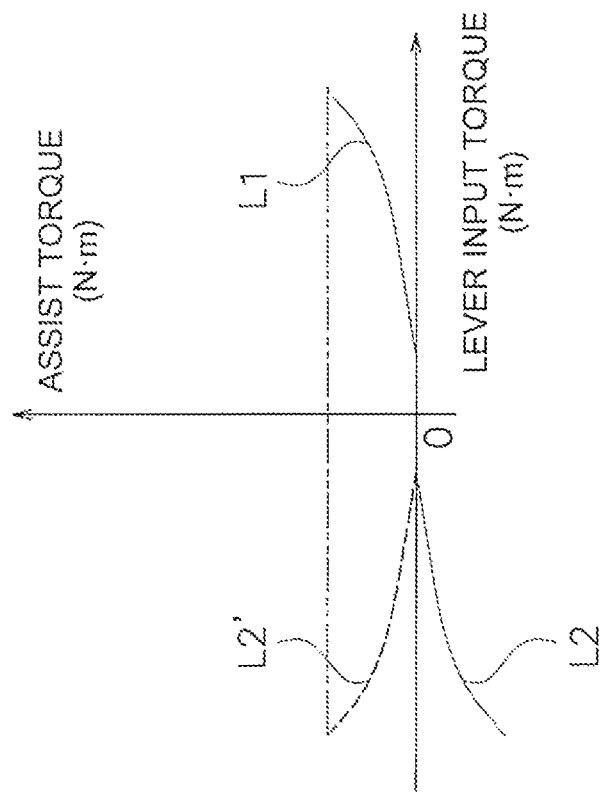
FIG. 9 is a graph of the assist torque to be imparted versus the torque sensed by the torque sensor.

FIG. 9 is a graph of the assist torque (assist torque information) to be imparted versus the torque sensed by the torque sensor 103. The assist torque information shown in FIG. 9 is stored in the storage device of the controller 28.

In the graph shown in FIG. 9, the positive lever input torque indicates the torque generated by rotation of the joystick lever 24 to the right side, and the negative lever input torque indicates the torque generated by rotation of the joystick lever 24 to the left side. Also, the positive assist torque indicates a case in which a force is applied by the force imparting component 27 to clockwise rotation, and the negative assist torque indicates a case in which a force is applied by the force imparting component 27 the counterclockwise rotation.

That is, the line L1 in FIG. 9 indicates that a force is imparted to the torque input shaft portion 84*b* in the clockwise direction when the joystick lever 24 is operated to the right side, and the line L2 indicates that a force is imparted to the torque input shaft portion 84*b* in the counterclockwise direction when the joystick lever 24 is operated to the left side. The assist torque is set such that the greater is the absolute value of the torque sensed by the torque sensor 103, the greater is the assist force that is imparted.

FIG. 9 shows a dotted line L2' that is symmetrical to the line L2 with respect to the horizontal axis. As can be seen by comparing the dotted line L2' with the line L1, when the joystick lever 24 is operated to the right and to the left, an assisting force is imparted in left and right symmetry. That is, when the absolute value of the lever input torque is equal in the left and right operations of the joystick lever 24, the same amount of assisting force is imparted.

When the operator operates the joystick lever 24 to generate torque on the torque input shaft portion 84b, the controller 28 finds the assisting force from this generated torque on the basis of the assist torque information shown in FIG. 9 and then controls the electric motor 111 to impart that assisting force.

This allows the lever counterforce when operating the joystick lever 24 to be reduced, and allows the lever to be operated with a light force.

Embodiment 2

The wheel loader 1 in Embodiment 2 of the present invention will now be described. The wheel loader 1 in Embodiment 2 differs from Embodiment 1 in that a rotary valve is used as the pilot valve instead of a spool valve. In Embodiment 2, the pilot valve is disposed at the articulation center A. In Embodiment 2 we will focus on what is different from the configuration in Embodiment 1. Those components in Embodiment 2 that are the same as in Embodiment 1 will be numbered the same and will not be described again.

1. Configuration 1-1. Pilot Valve

Figure 10:
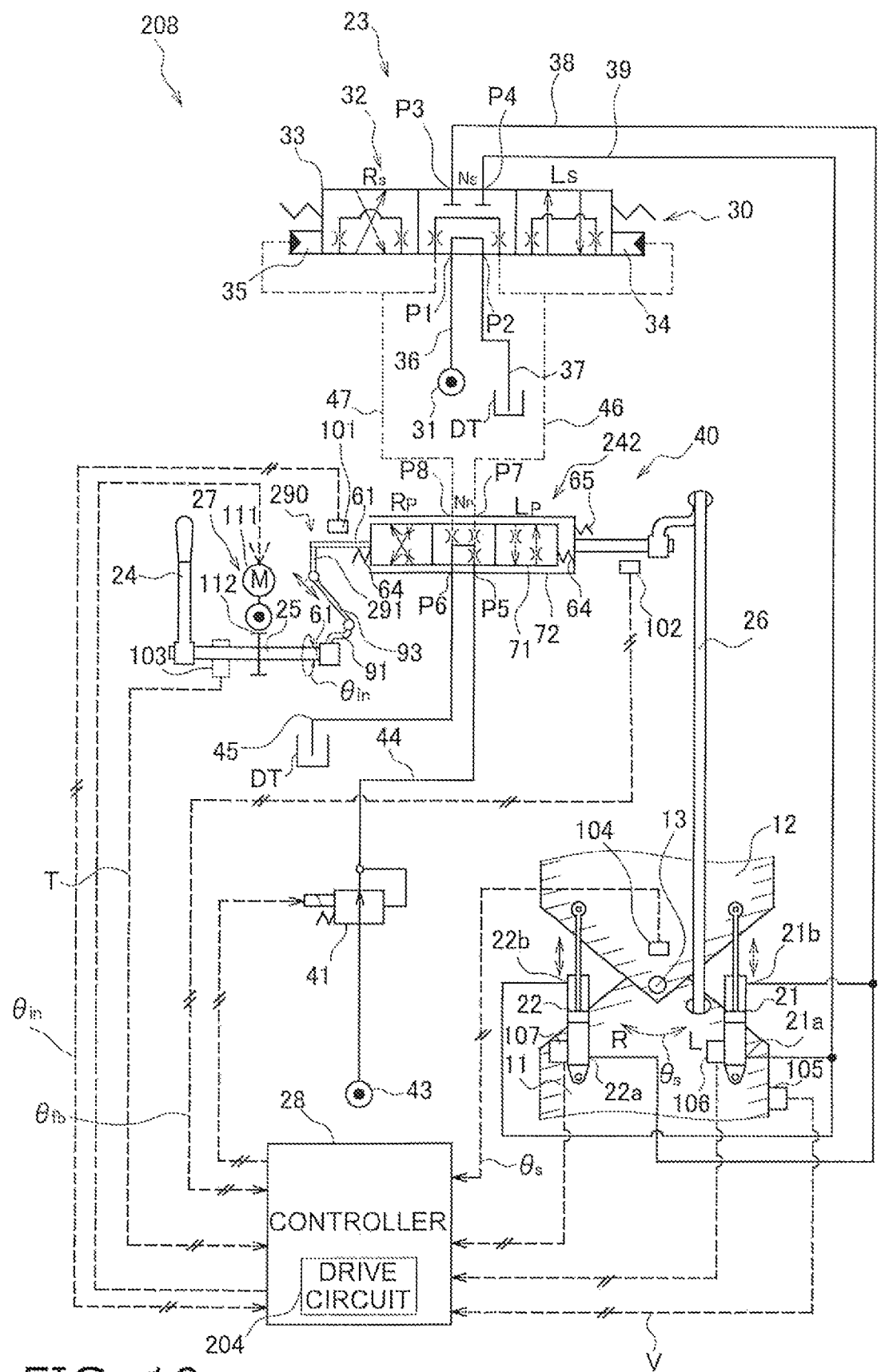
FIG. 10 is a hydraulic circuit diagram showing the configuration of the steering operation device of a wheel loader according to Embodiment 2 of the present invention.

FIG. 10 is a hydraulic circuit diagram showing the configuration of a steering operation device 208 in Embodiment 2. The steering operation device 208 in this embodiment differs from Embodiment 1 in that a pilot valve 242 which is a rotary valve is provided.

Figure 11:
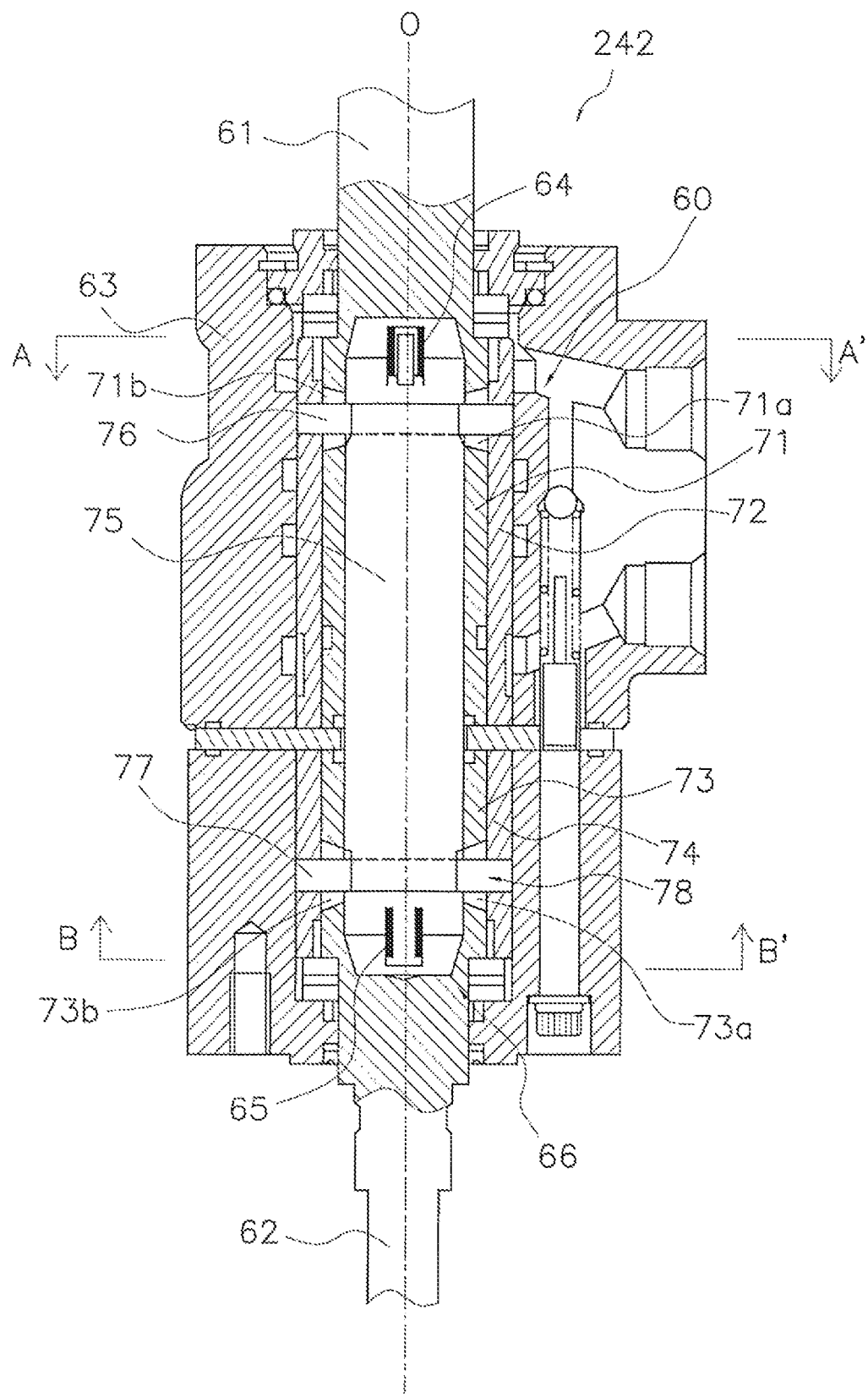
FIG. 11 is a cross sectional configuration diagram of the pilot valve in FIG. 10.

FIG. 11 is a cross sectional configuration diagram of the pilot valve 242.

The pilot valve 242 mainly has a valve body component 60, an operation input shaft 61, a feedback input shaft 62, a housing 63, a first spring 64, a second spring 65, and a feedback component 66.

Operation Input Shaft

The operation input shaft 61 is provided rotatably around its center axis O, and is inserted into the housing 63. The operation input shaft 61 is connected to the joystick lever 24 (discussed below) via the connecting portion 25. The operation input shaft 61 rotates to the left and right of the joystick lever 24 at the same rotation angle as the rotation angle θin.

Feedback Input Shaft

The feedback input shaft 62 is disposed coaxially with the operation input shaft 61, and is provided rotatably around the center axis O. The feedback input shaft 62 is inserted into the housing 63 so as to be opposite the operation input shaft 61. The feedback input shaft 62 is connected to the front frame 11 via the feedback link mechanism 26 (discussed below), and rotates at the same rotation angle as the steering angle θs of the front frame 11 with respect to the rear frame 12.

Housing

A substantially cylindrical space is formed in the housing 63, and the operation input shaft 61 and the feedback input shaft 62 are inserted as described above. The housing 63 houses the valve body component 60 and the feedback component 66, and the pilot pump port P5, the pilot drain port P6, the first pilot port P7, and the second pilot port P8 are formed in the housing 63.

Valve Body

The valve body component 60 has the operation spool 71 and the operation sleeve 72, and moves between the neutral position Np, the left pilot position Lp, and the right pilot position Rp when the operation spool 71 rotates with respect to the operation sleeve 72.

The operation spool 71 is substantially cylindrical in shape and is disposed coaxially with the operation input shaft 61, and is connected to the operation input shaft 61. The joystick lever 24 is connected to the operation input shaft 61 via the connecting portion 25 and a link mechanism 290, and when the operator operates the joystick lever 24 to the right side by the rotation angle θin, the operation input shaft 61 and the operation spool 71 also rotate to the right around the center axis O by the rotation angle θin. Slits 71a and 71b are formed in the operation spool 71 near the operation input shall 61, along the circumferential direction at two opposing positions so as to sandwich the center axis O in between.

The operation sleeve 72 has a substantially cylindrical shape and is disposed outside the operation spoof 71 and inside the housing 63 so as to be rotatable with respect to the operation spool 71 and the housing 63.

In this specification, "right rotation" and "left rotation" refer to the rotation direction when viewed from above.

First Spring

The first spring 64 is inserted between the operation spool 71 and the operation sleeve 72, which are rotatable with respect to each other, and generates a counterforce corresponding to the difference in rotation angle between the operation spool 71 and the operation sleeve 72.

Figure 12B:
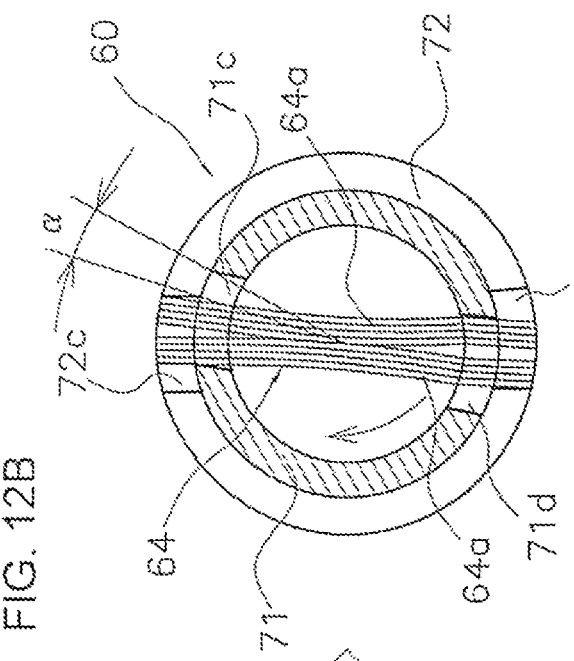
FIGS. 12A and 12B are cross sections along the A-A' line in FIG. 11, and FIGS. 12C and 12D are cross sections along the B-B' line in FIG. 11.
Figure 12D:
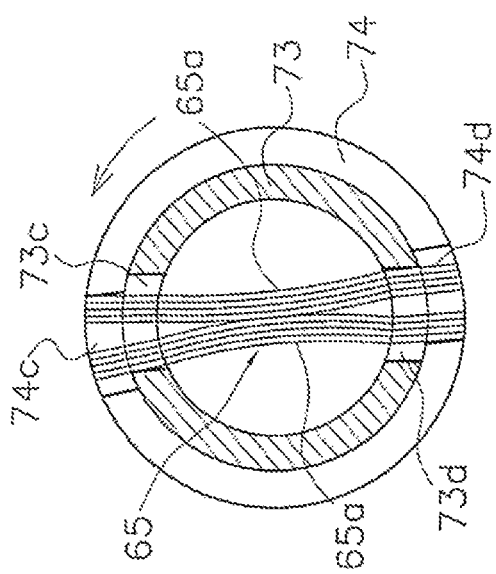
Figure 12A:
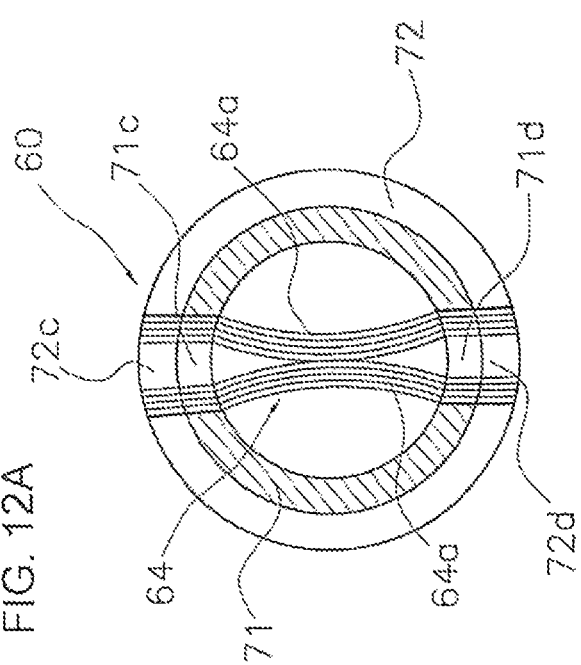

FIG. 12A is a cross section along the A-A' line perpendicular to the center axis O. As shown in FIG. 12A, square holes 71c and 71d are provided to diametrically opposed walls of the operation spool 71. Also, rectangular grooves 72c and 72d are formed in diametrically opposed walls at the end of the operation sleeve 72 on the operation input shaft 61 side. The first spring 64 is formed from two sets of leaf springs 64a in which a plurality of convex leaf springs are stacked. The two sets of leaf springs 64a are arranged so that the convex parts are opposite each other to form an X shape in FIG. 12A. The two sets of leaf springs 64a pass through the holes 71c and 71d in the operation spool 71, and both ends thereof intrude the grooves 72c and 72d in the operation sleeve 72. In this manner, the operation spool 71 and the operation sleeve 72 are linked by the first spring 64.

As shown in FIG. 12A, a state in which the circumferential positions of the hole 71c and the groove 72c substantially coincide and the circumferential positions of the hole 71d and the groove 72d substantially coincide is a state in which the valve body component 60 is in the neutral position Np.

Also, when the joystick lever 24 is operated, the operation spool 71 rotates with respect to the operation sleeve 72 as shown in FIG. 12B, and the operation spool 71 moves to the left pilot position Lp or the right pilot position Rp with respect to the operation sleeve 72. When the joystick lever 24 is rotated to the right, the operation spool 71 rotates to the right with respect to the operation sleeve 72 and moves to the right pilot position Rp. When the joystick lever 24 is rotated to the left, the operation spool 71 rotates to the left with respect to the operation sleeve 72 and moves to the left pilot position Lp.

In this movement, since the operator moves the joystick lever 24 against the spring force of the first spring 64, a lever counterforce is generated at the joystick lever 24. In other words, the first spring 64 biases the operation spool 71 so as to be in the neutral position Np with respect to the operation sleeve 72.

Feedback Component

Meanwhile, the feedback component 66 feeds back the steering angle θs of the front frame 11 with respect to the rear frame 12 to the valve body component 60. The feedback component 66 mainly has a feedback spool 73, a feedback sleeve 74, a drive shaft 75, a first center pin 76, and a restrictor 78.

The drive shaft 75 is disposed between the operation input shaft 61 and the feedback input shaft 62, and is disposed coaxially with the operation input shaft 61 and the feedback input shaft 62 (the center axis O). The drive shaft 75 is disposed inside the operation spool 71. The first center pin 76 is disposed perpendicular to the center axis O at the end of the drive shaft 75 on the operation input shaft 61 side. The ends of the first center pin 76 pass through the slits 71a and 71b and are fixed to the operation sleeve 72. As will be described in detail below, the rotation angle of the operation spool 71 with respect to the operation sleeve 72 is restricted to an angle within a specific range by the first center pin 76 and the slits 71a and 71b. Also, since the first center pin 76 is fixed to the operation sleeve 72 and the drive shaft 75, when the drive shaft 75 rotates, the operation sleeve 72 integrated with the drive shaft 75 also rotates.

The feedback spool 73 has a substantially cylindrical shape and is disposed coaxially with the feedback input shaft 62, and is connected to the feedback input shaft 62. Slits 73a and 73b are formed in the feedback spool 73 in the circumferential direction near the feedback input shaft 62, at two positions opposite each other with the center axis O in between. The drive shaft 75 is disposed inside the feedback spool 73. The feedback input shaft 62 is linked to the front frame 11 via the feedback link mechanism 26 (discussed below), and when the front frame 11 rotates to the right by the steering angle θs with respect to the rear frame 12, the feedback input shaft 62 and the feedback spool 73 also rotate to the right by the same rotation angle θs as the steering angle θs.

The feedback sleeve 74 has a substantially cylindrical shape and is disposed outside the feedback spool 73 and inside the housing 63 so as to be rotatable with respect to the feedback spool 73 and the housing 63.

The restrictor 78 restricts the rotation of the feedback sleeve 74 with respect to the feedback spool 73 to an angle within a specific range. The restrictor 78 is constituted by a second center pin 77 and wall portions 73ae and 73be (see FIG. 7 (discussed below)) at the ends of the slits 73a and 73b in the circumferential direction.

The second center pin 77 is disposed at the end of the drive shaft 75 on the feedback input shaft 62 side, perpendicular to the center axis O. The ends of the second center pin 77 pass through the slits 73a and 73b and are fixed to the feedback sleeve 74. The rotation of the feedback sleeve 74 relative to the feedback spool 73 is restricted to an angle within a specific range by the second center pin 77 and the slits 73a and 73b. Also, since the second center pin 77 is fixed to the feedback sleeve 74 and the drive shaft 75, when the feedback sleeve 74 rotates, the drive shaft 75 integrated with the feedback sleeve 74 also rotates. When the drive shaft 75 rotates, the operation sleeve 72 fixed to the drive shaft 75 by the first center pin 76 is rotated.

Second Spring

Figure 12C:
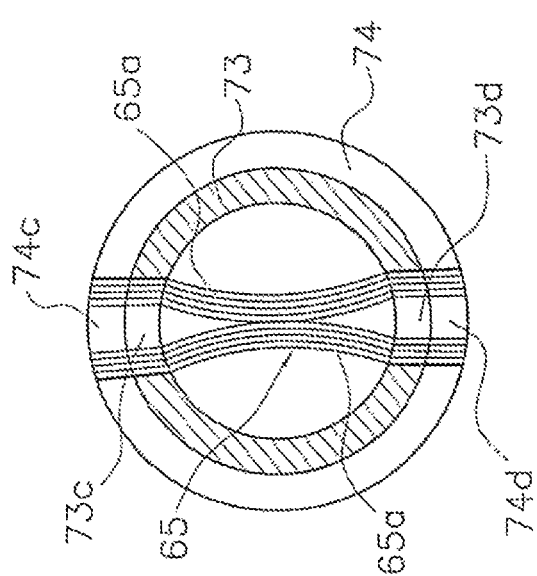

The second spring 65 is inserted between the feedback spool 73 and the feedback sleeve 74, which are rotatable with respect to each other, and generates a counterforce corresponding to the rotation difference between the spool and the sleeve. FIG. 12C is a cross section along the B-B' line in FIG. 11.

As shown in FIG. 12C, square holes 73c and 73d are provided to the feedback spool 73, in diametrically opposed walls.

Rectangular grooves 74c and 74d are formed in diametrically opposite walls at the end of the feedback sleeve 74 on the feedback input shaft 62 side. The second spring 65 is formed from two sets of leaf springs 65a in which a plurality of convex leaf springs are stacked. The two sets of leaf springs 65a are disposed so that the convex parts are opposite each other to form an X shape in FIG. 12C. The two sets of leaf springs 65a pass through the holes 73c and 73d in the feedback spool 73 and both ends thereof intrude the grooves 74c and 74d in the operation sleeve 72. In this manner, the feedback spool 73 and the feedback sleeve 74 are linked by the second spring 65. In the state in FIG. 12C, the hole 73c and the groove 74c coincide in the circumferential direction, and the hole 73d and the groove 74d coincide in the circumferential direction. Thus, the feedback sleeve 74 is biased by the second spring 65 so that the positions of the grooves 74c and 74d in the circumferential direction match up with the circumferential positions of the holes 73c and 73d of the feedback spool 73.

Although the first spring 64 bends until the operation spool 71 is restricted with respect to the operation sleeve 72, the second spring 65 is set to begin bending upon being subjected to a force greater than or equal to the counterforce generated in the first spring 64 until the first spring 64 is restricted.

More precisely, as will be discussed below through reference to FIG. 14, when the operation spool 71 rotates to the angle at which the operation spool 71 is restricted with respect to the operation sleeve 72, and when the joystick lever 24 is then operated, as shown in FIG. 12D, the second spring 65 bends and the feedback sleeve 74 rotates with respect to the feedback spool 73. FIG. 12D is a cross section along the B-B' line in FIG. 11, and since the view is from below, the arrows in the rotation direction are opposite to those in FIG. 12B.

That is, when the joystick lever 24 is operated beyond the angle at which the operation spool 71 is restricted with respect to the operation sleeve 72, the operator will have to operate the joystick lever 24 against the biasing force of the second spring 65.

With the above configuration of the feedback unit 66, when the feedback input shaft 62 rotates in response to a change in the steering angle, the feedback spool 73 rotates, and the feedback sleeve 74 linked to the feedback spool 73 via the second spring 65 also rotates. Then, the operation sleeve 72 fixed to the feedback sleeve 74 via the second center pin 77, the drive shaft 75, and the first center pin 76 rotates, a change occurs in the difference in the rotation angle between the operation spool 71 and the operation sleeve 72, and the pilot pressure is changed.

That is, with the pilot valve 242, the position of the operation spool 71 with respect to the operation sleeve 72 moves to the neutral position Np, the left pilot position Lp, or the right pilot position Rp according to the difference α between the rotation angle θin of the operation input shaft 61 and the rotation angle fb of the feedback input shaft 62 (which coincides with the steering angle θs). When the rotation angle difference α is zero, the operation spool 71 is in the neutral position Np with respect to the operation sleeve 72. When the operation spool 71 is in the left pilot position Lp or the right pilot position Rp with respect to the operation sleeve 72, the pilot valve 242 changes the opening surface area through which fluid passes from the pilot hydraulic pressure source 43 in accordance with the rotation angle difference α. This adjusts the pilot pressure that is sent from the pilot valve 242 to the steering valve 32 according to the difference α of the rotation angle.

In addition, the operation input shaft 61 is provided with a first rotation angle sensor 101 constituted by a rotary sensor, for example. The first rotation angle sensor 101 senses the rotation angle θin of the operation input shaft 61. The feedback input shaft 62 is also provided with a second rotation angle sensor 102 constituted by a rotary sensor, for example. Also, the second rotation angle sensor 102 senses the rotation angle θfb (=θs) of the feedback input shaft 62. The rotation angles θin and θfb sensed by the first rotation angle sensor 101 and the second rotation angle sensor 102 are sent to the controller 28 as sensing signals.

As described above, the steering angle θs is also sensed by the steering angle sensor 104 in the connecting shaft 13, but since the rotation angle θfb of the feedback input shaft 62 coincides with the steering angle θs, the steering angle sensor 104 need not be provided.

1-2. Pilot Valve Disposition

Figure 13:
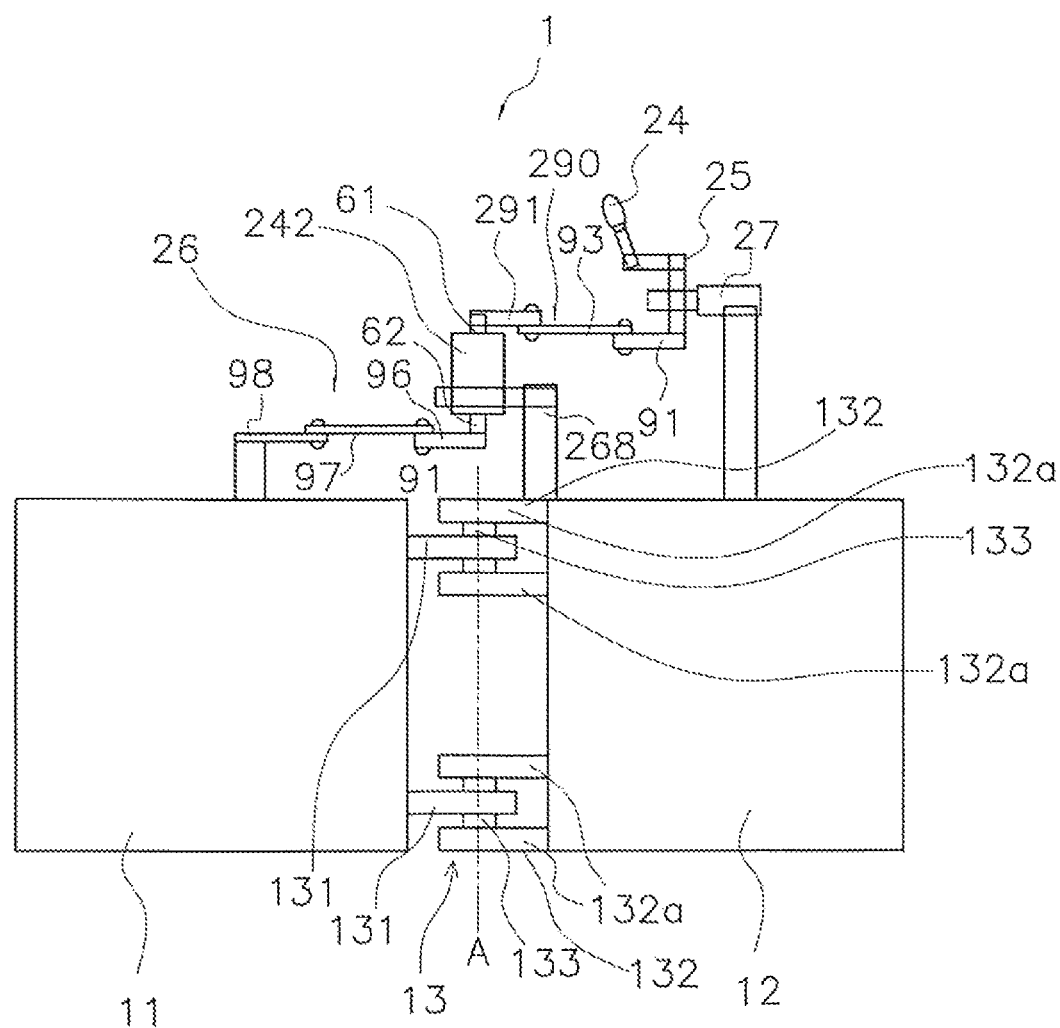
FIG. 13 is a simplified side view of the arrangement of the pilot valve in FIG. 11.

FIG. 13 is a simplified side view of the disposition of the pilot valve 242. As shown in FIG. 13, the pilot valve 242 is disposed on the upper side of the connecting shaft 13 and on the articulation center A. The pilot valve 242 is disposed so that its center axis O coincides with the articulation center A.

A bracket 268 is fixed to the rear frame 12, and the bracket 268 extends from the rear frame 12 to the articulation center A. The housing 63 of the pilot valve 242 is fixed to the bracket 268.

In Embodiment 2, as shown in FIG. 13, a link mechanism 290 is provided in place of the link mechanism 90. The link mechanism 290 has the first arm member 91 and the first rod member 93, but unlike the link mechanism 90 in Embodiment 1, the link mechanism 290 does not have the rotation member 92 or the second rod member 94. Also, the link mechanism 290 has an input lever member 291 fixed to the operation input shaft 61. The input lever member 291 is provided so as to protrude horizontally from the operation input shaft 61. The distal end of the input lever member 291 and the first rod member 93 are rotatably connected to each other.

The lower end of the feedback input shaft 62 is linked to the front frame 11 by a feedback link mechanism 26. The feedback input shaft 62 rotates at the same rotation angle as the steering angle θs of the front frame 11 with respect to the rear frame 12.

The feedback link mechanism 26 includes a follow-up lever 96, a follow-up link 97, and a bracket 98. The follow-up link 97 is fixed to the feedback input shaft 62 of the pilot valve 242. The bracket 98 is fixed to the front frame 11. The follow-up link 97 links the follow-up lever 96 and the bracket 98.

The pilot valve 242 fixed to the rear frame 12 is linked to the front frame 11 by this feedback link mechanism 26.

The feedback link mechanism 26 makes the steering angle θs of the front frame 11 with respect to the rear frame 12 be the same as the rotation angle θfb of the feedback input shall 62.

That is, when the front frame 11 rotates to the right side at the steering angle θs around the connecting shaft 13 with respect to the rear frame 12, the feedback input shaft 62 also rotates to the right by the rotation angle θs via the feedback link mechanism 26, and when the front frame 11 rotates to the left side at the steering angle θs, the feedback input shaft 62 also rotates to the left at the rotation angle θs via the feedback link mechanism 26.

1-3. Lever Counterforce

The lever counterforce generated by the first spring 64 and the second spring 65 when operating the joystick lever 24 will now be described.

FIG. 14A is a simplified diagram of the pilot valve 242. FIG. 14B is a graph of the relation between the vehicle body-lever deviation angle and the lever counterforce. The vehicle body-lever deviation angle α is the difference (θin−θfb) between the rotation angle θin of the joystick lever 24 and the steering angle θs (=θfb) of the front frame 11 with respect to the rear frame 12. FIG. 14C consists of cross sections along the C-C', D-D', E-E', and F-F' lines in FIG. 14A when the deviation angle α is zero. FIG. 14D consists of cross sections along the C-C', D-D', E-E', and F-F' lines in FIG. 14A when the deviation angle α is θ2. FIG. 14E consists of cross sections along the C-C', D-D', E-E', and F-F' lines in FIG. 14A when the deviation angle α is θ3. As shown in FIG. 14A, the cross sections along the C-C', D-D', E-E', and F-F' lines are all views from above. In FIG. 14B, play in the joystick lever 24 is not taken into account in order to make the drawing easier to understand.

When the operator rotates the joystick lever 24 from the center position by the rotation angle θin, the operation input shaft 61 also rotates by the rotation angle θin. On the other hand, since the response of the steering cylinders 21 and 22 is delayed, the steering angle θs gradually increases following the rotation angle θin. This rotation angle θin of the joystick lever 24 indicates the target steering angle, and the steering angle θs indicates the actual steering angle. The feedback input shaft 62 also rotates at the same rotation angle θs as the steering angle θs in response to a change in the steering angle θs. The feedback spool 73 also rotates along with the feedback input shaft 62, and the feedback sleeve 74 linked via the second spring 65 also rotates as a result of this rotation.

Here, since the feedback sleeve 74 and the operation sleeve 72 are integrated by the first center pin 76, the second center pin 77, and the drive shaft 75, the operation sleeve 72 is also rotated by the rotation of the feedback sleeve 74.

That is, the difference in rotation angle that occurs between the rotation angle of the operation spool 71 and the rotation angle of the operation sleeve 72 corresponds to the deviation angle α (see FIG. 12B).

Since the first spring 64 biases the operation spool 71 to the neutral position Np with respect to the operation sleeve 72, in order to increase the deviation angle α, the joystick lever 24 has to be operated against the biasing force of the first spring 64.

The first spring 64 has the spring characteristic S1 shown in FIG. 14B. With the spring characteristic S1 of the first spring 64, in order to rotate the operation input shaft 61, the joystick lever 24 has to be operated with a force greater than or equal to the initial counterforce F1 (the force required to start bending the first spring 64). Also, with the spring characteristic S1 of the first spring 64, the lever counterforce increases as the deviation angle α increases. That is, as the deviation angle α increases, the force required to operate the joystick lever 24 increases.

As shown in FIG. 14C, in the neutral position Np where the deviation angle α is zero, the first center pin 76 is disposed in the center of the slits 71a and 71b of the operation spool 71. Also, the second center pin 77 is disposed in the center of the slits 73a and 73b of the feedback spool 73.

Then, the deviation angle α is increased by turning the joystick lever 24 to the right, for example, and when the deviation angle α reaches the angle θ2, as shown in FIG. 14D, the first center pin 76 hits the wall portion 71ae formed in the circumferential direction of the slit 71a, and the wall portion 71be formed in the circumferential direction of the slit 71b. At this point, the second center pin 77 is disposed in the center of the slits 73a and 73b of the feedback spool 73. This is because, if we let F2 be the counterforce produced by the first spring 64 when the deviation angle α is the angle θ2, the initial counterforce (the force necessary to start bending the second spring 65) is set to F2 as indicated by the spring characteristic S2 of the second spring 65. The initial counterforce of the second spring 65 may be set higher than F2, as long as it is equal to or greater than F2.

Furthermore, in order for the operator to rotate the joystick lever 24 to the right, it is necessary to operate the joystick lever 24 against the counterforce of the second spring 65. That is, when the joystick lever 24 is rotated further to the right, the first center pin 76 hits the wall portion 71be and the wall portion 71ae, so if the operator tries to rotate operation spool 71, it is necessary to rotate the operation sleeve 72 as well. Also, as described above, the operation sleeve 72 is integrated with the feedback sleeve 74, and the feedback spool 73 is connected to the feedback input shaft 62. Therefore, when the joystick lever 24 is further rotated to the right, as shown in FIG. 12D, the joystick lever 24 is operated against the counterforce of the second spring 65.

When the deviation angle α reaches Θ3, the second center pin 77 hits the wall portion 73ae formed in the circumferential direction of the slit 73a and the wall portion 73be formed in the circumferential direction of the slit 73b, as shown in FIG. 14E. Thus, the second center pin 77 can rotate by an angle of (θ3−θ2). That is, the pilot valve 42 is configured so that the deviation angle α cannot be greater than the angle θ3. Therefore, as shown in FIG. 14B, the lever counterforce rises linearly at the angle θ3. If the second center pin 77 hits the wall portions 73ae and 73be hard, it produces a sudden reaction that subjects the wrist of the operator to a load. This angle θ3 is also called a catch-up angle.

FIG. 14B illustrates an example in which the joystick lever 24 is rotated to the right, but the same holds true when it is rotated to the left.

A difference is generated between the rotation angle of the operation spool 71 and the rotation angle of the operation sleeve 72 up until the deviation angle α reaches θ2, but once the angle θ2 is exceeded, there is no longer any difference in the rotation angle between the operation spool 71 and the operation sleeve 72, so the aperture of the pilot valve 42 is constant. Also, the aperture of the pilot valve 42 is constant while the deviation angle α is between the angles θ2 and θ3, but the pilot pressure may be varied according to the deviation angle by controlling the variable pressure reducer 41.

2. Operation

The articulation of the wheel loader 1 in this embodiment will be described below.

When the joystick lever 24 is in its center position, the operation input shaft 61 is in a specific initial position, and the rotation angle θin of the operation input shaft 61 is zero. Since the steering angle θs is also zero, the feedback input shaft 62 is also in a specific initial position. In this embodiment, as shown in FIG. 14A, if zero is a state of running along the longitudinal direction with respect to the rear frame 12, then the steering angle θs is the angle from that state. Also, as shown in FIG. 5, the rotation angle θin indicates the rotation angle from the center position of the joystick lever 24. In finding the deviation angle, rotation to the right may be calculated as a positive angle and rotation to the left may be calculated as a negative angle, for example.

At this point, the operation spool 71 is in the neutral position Np shown in FIG. 12A with respect to the operation sleeve 72. In this case, the pilot pressure is the same in the first pilot chamber 34 and the second pilot chamber 35 of the steering valve 32, and the valve body 33 of the steering valve 32 is also in the neutral position Ns. Therefore, fluid is neither supplied to nor discharged from the left and right steering cylinders 21 and 22, the steering angle θs is maintained at zero, and the rotation angle θfb (=θs) of the feedback input shaft 62 is also maintained at zero.

Next, the operator applies the operation force Fin in order to rotate the joystick lever 24 from the center position to the right side as shown in FIG. 5. If the operation force Fin exceeds F1 of the first spring 64, the operation input shall 61 rotates to the right just like the joystick lever 24, and the rotation angle θin of the operation input shaft 61 increases. At this point, the steering angle θs is still zero and the rotation angle θfb (=θs) of the feedback input shaft 62 is also zero, due to the delay in the response of the left and right steering cylinders 21 and 22. Therefore, the deviation angle (α=θin−θs) between the rotation angle θin and the steering angle θs increases.

The operation spool 71 rotates to the right with respect to the operation sleeve 72 along with the rotation of the operation input shaft 61. Here, the operation sleeve 72 is integrated with the feedback sleeve 74, and the feedback sleeve 74 is linked to the feedback spool 73 by the second spring 65. The initial counterforce F2 of the second spring 65 is greater than or equal to the counterforce of the spring characteristic S1 of the first spring 64 shown in FIG. 14B. Therefore, the operation sleeve 72 does not rotate along with the operation spool 71, and the operation spool 71 rotates to the right with respect to the operation sleeve 72.

Thus, the operation spool 71 rotates to the right with respect to the operation sleeve 72 and moves to the right pilot position Rp, pilot pressure is supplied to the second pilot port P8, and pilot pressure is supplied to the second pilot chamber 35.

Consequently, the valve body 33 of the steering valve 32 moves to the right steering position Rs, fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22. Consequently, the steering angle θs gradually increases, and the front frame 11 is pointed to the right with respect to the rear frame 12 (see R in FIG. 10). This change in the steering angle θs is transmitted by the feedback link mechanism 26 to the feedback input shaft 62, and the feedback input shaft 62 rotates at the rotation angle θs.

When the operator stops the joystick lever 24 at a specific rotation angle θ1, the operation input shaft 61 also stops at the rotation angle θ1. On the other hand, since the steering angle θs gradually increases, the rotation angle θs of the feedback input shaft 62 also increases. The feedback spool 73 rotates along with the feedback input shaft 62, and the feedback sleeve 74 linked to the feedback spool 73 via the second spring 65 also rotates. Since the feedback sleeve 74 is integrated with the operation sleeve 72 via the first center pin 76, the second center pin 77, and the drive shaft 75, the operation sleeve 72 also rotates along with the rotation of the feedback sleeve 74. The difference in the rotation angle between the operation sleeve 72 and the operation spool 71 (the deviation angle α) decreases as the operation sleeve 72 rotates. When the steering angle θs (the rotation angle θs of the feedback input shaft 62) catches up with the rotation angle θ1 (the rotation angle θin of the operation input shaft 61), the deviation angle α drops to zero. At this point, the operation spool 71 of the pilot valve 42 is in the neutral position Np with respect to the operation sleeve 72. In this case, the pilot pressure is the same in the first pilot chamber 34 and the second pilot chamber 35 of the steering valve 32, and the steering valve 32 is also in the neutral position Ns. Accordingly, fluid is neither supplied to nor discharged from the left and right steering cylinders 21 and 22, and the steering angle θs is maintained at the rotation angle θ1.

Thus, when the joystick lever 24 is rotated to the right and stopped at the specific rotation angle θ1, the steering angle θs is also maintained at the same rotation angle θ1. Consequently, the front frame 11 is kept facing in the direction of the rotation angle θ1, to the right with respect to the rear frame 12.

Next, when the operator returns the joystick lever 24 from the right side position toward the center position, the operation input shaft 61 similarly rotates, and the rotation angle θin of the operation input shaft 61 decreases. At this point, because of the delay in the response of the left and right steering cylinders 21 and 22, the steering angle θs is still in the state of the rotation angle θ1. Therefore, the difference α in rotation angle (=θin−θs) decreases from zero and becomes negative. Then, the operation spool 71 rotates to the left with respect to the operation sleeve 72 and moves to the left pilot position Lp, and pilot pressure is supplied to the first pilot port P7. Consequently, the valve body 33 of the steering valve 32 moves to the left steering position Ls, fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22. The steering angle θs therefore gradually decreases from the rotation angle θ1. This change in the steering angle θs is transmitted by the feedback link mechanism 26 to the feedback input shaft 62, and the feedback input shaft 62 rotates at the same change in the rotation angle as the change in the steering angle θs.

When the operator stops the joystick lever 24 in the central position, the operation input shaft 61 also stops in the initial position, that is, at the position where the rotation angle θin is zero. On the other hand, since the steering angle θs is also gradually decreasing from the rotation angle θ1, the difference in the rotation angle (deviation angle) α gradually decreases. When the steering angle θs goes to zero, the rotation angle θfb of the feedback input shaft 62 (=θs) also goes to zero, and the difference α in the rotation angle goes to zero. At this point, the operation spool 71 is disposed in the neutral position Np with respect to the operation sleeve 72. In this case, the pilot pressure is the same in the first pilot chamber 34 and the second pilot chamber 35 of the steering valve 32, and the steering valve 32 is also in the neutral position Ns. Therefore, fluid is neither supplied to nor discharged from the left and right steering cylinders 21 and 22, and the steering angle θs also returns to zero and is held there. As a result, the front frame 11 is returned to an orientation along the longitudinal direction with respect to the rear frame 12.

When the joystick lever 24 is rotated to the left side, everything is the same as above, so it will not be described again.

As described above, providing the link mechanism 290 allows the pilot valve 242 to be disposed at the articulation center A.

Embodiment 3

The wheel loader 1 in Embodiment 3 of the present invention will now be described. The wheel loader 1 in Embodiment 3 differs from Embodiment 2 in that the pilot valve 242 is fixed to the front frame 11 via a mounting bracket. In Embodiment 3 we will locus on the difference from Embodiment 2. Also, in Embodiment 3, those components that are the same as in Embodiment 2 will be numbered the same and will not be described again.

1. Configuration 1-1. Pilot Valve

Figure 15:
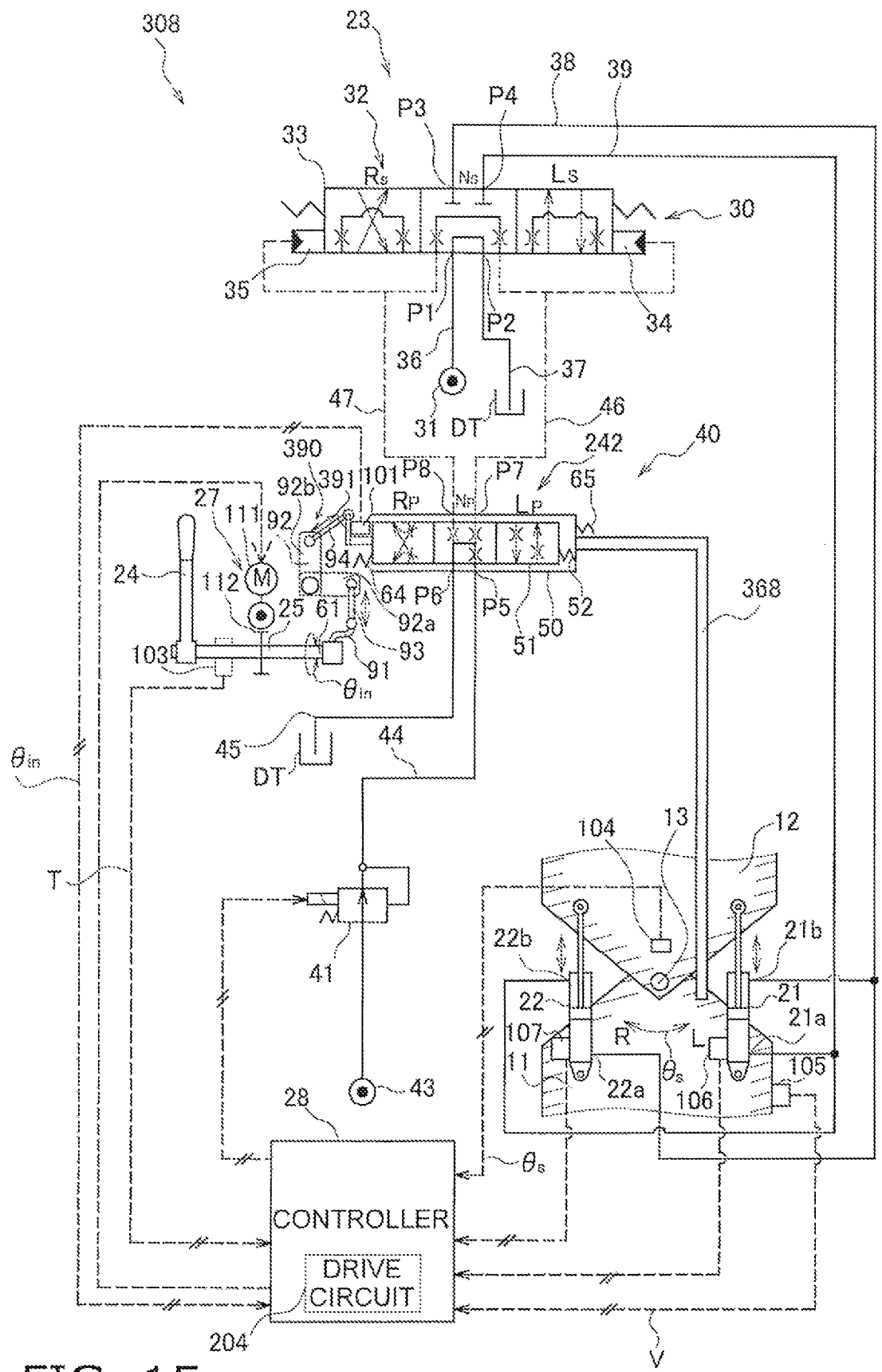
FIG. 15 is a hydraulic circuit diagram showing the configuration of the steering operation device of a wheel loader according to Embodiment 3 of the present invention.
Figure 16:
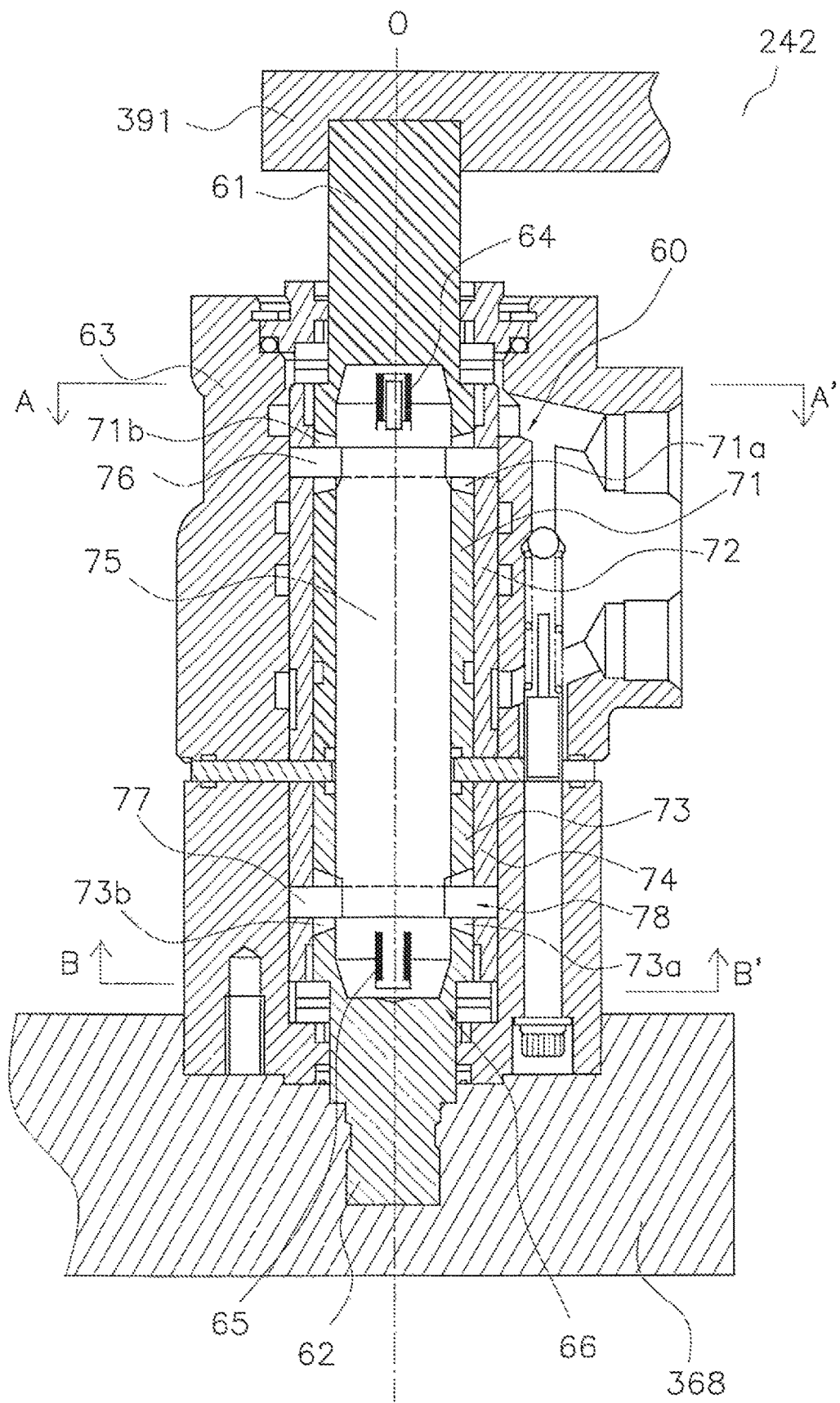
FIG. 16 is a simplified side view of the arrangement of the pilot valve in FIG. 15.
Figure 17:
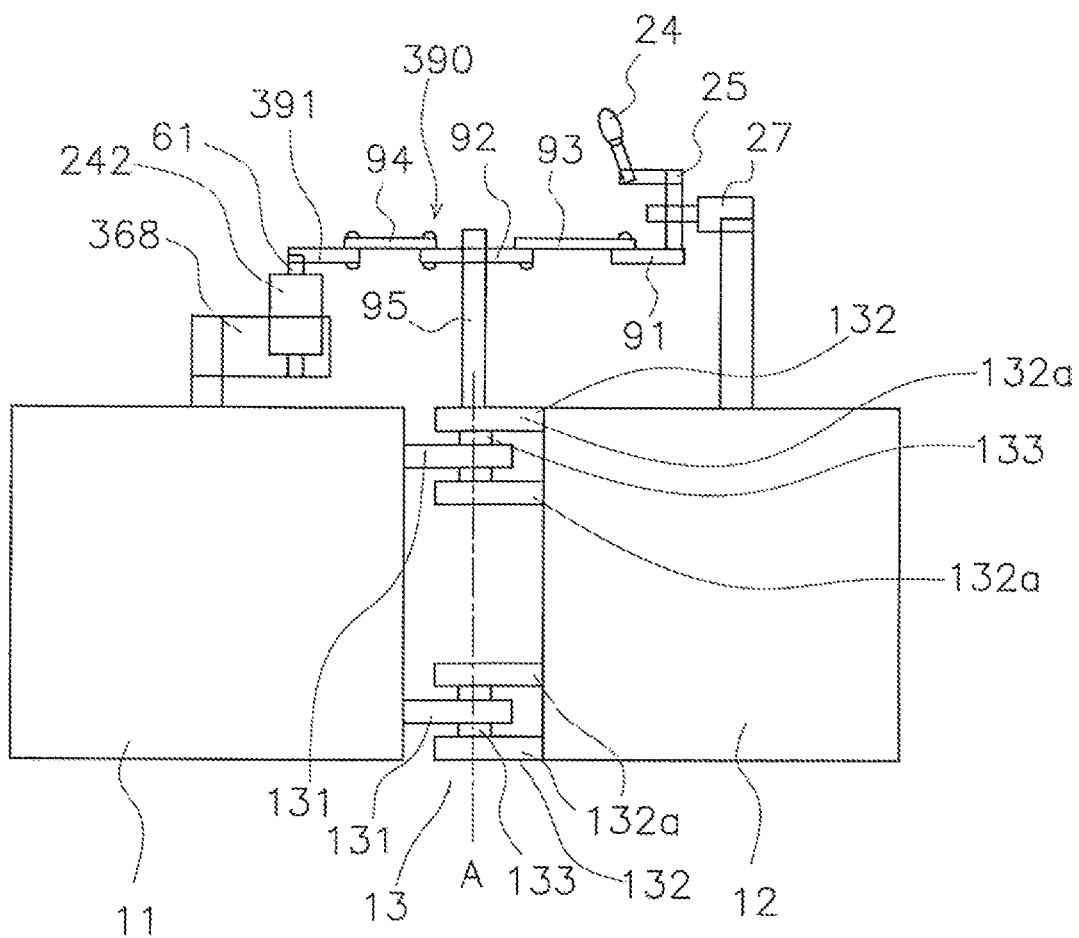
FIG. 17 is a simplified side view of the arrangement of the pilot valve of FIG. 11.

FIG. 15 is a hydraulic circuit diagram showing the configuration of a steering operation device 308 in Embodiment 3. FIG. 16 is a cross sectional configuration diagram of the pilot valve 242. FIG. 17 is a simplified side view illustrating the installation of the pilot valve 242.

As shown in FIG. 16, with the pilot valve 242 in Embodiment 3, the feedback input shaft 62 and the housing 63 are fixed to the mounting bracket 368. As shown in FIG. 17, the mounting bracket 368 is fixed to the front frame 11. The pilot valve 121 is thus fixed to the front frame 11.

1-2. Link Mechanism 390

The link mechanism 390 in this embodiment is like the link mechanism 90 in Embodiment 1, but is further provided with an input lever member 391. That is, the link mechanism 390 has the first arm member 91, the rotation member 92, the first rod member 93, the second rod member 94, and the input lever member 391.

The input lever member 391 is fixed to the operation input shaft 61. The input lever member 391 is provided so as to protrude horizontally from the operation input shaft 61.

The input lever member 391 is rotatably connected to the end of the second rod member 94 on the front side.

2. Operation

The articulation of the wheel loader 1 in this embodiment will now be described.

Figure 18B:
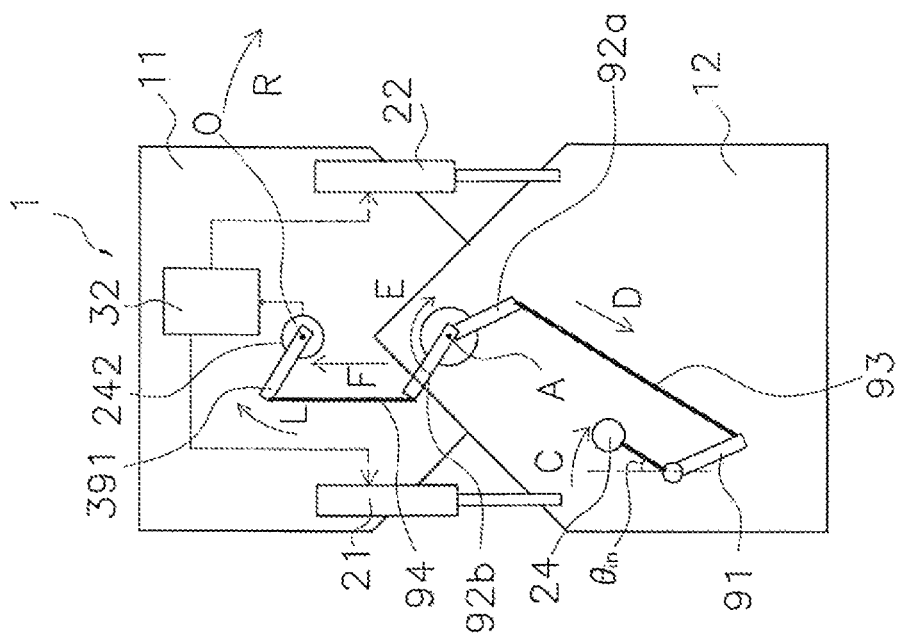
FIG. 18B is a diagram illustrating the steering operation of the wheel loader in Embodiment 3 of the present invention.
Figure 18A:
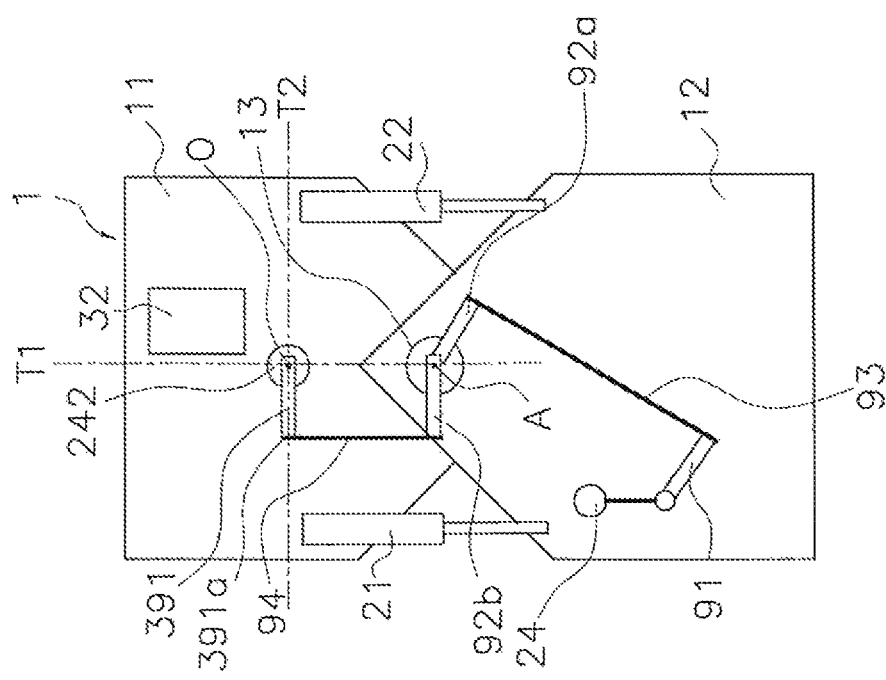
FIG. 18A is a diagram illustrating the steering operation of the wheel loader in Embodiment 3 of the present invention.
Figure 18C:
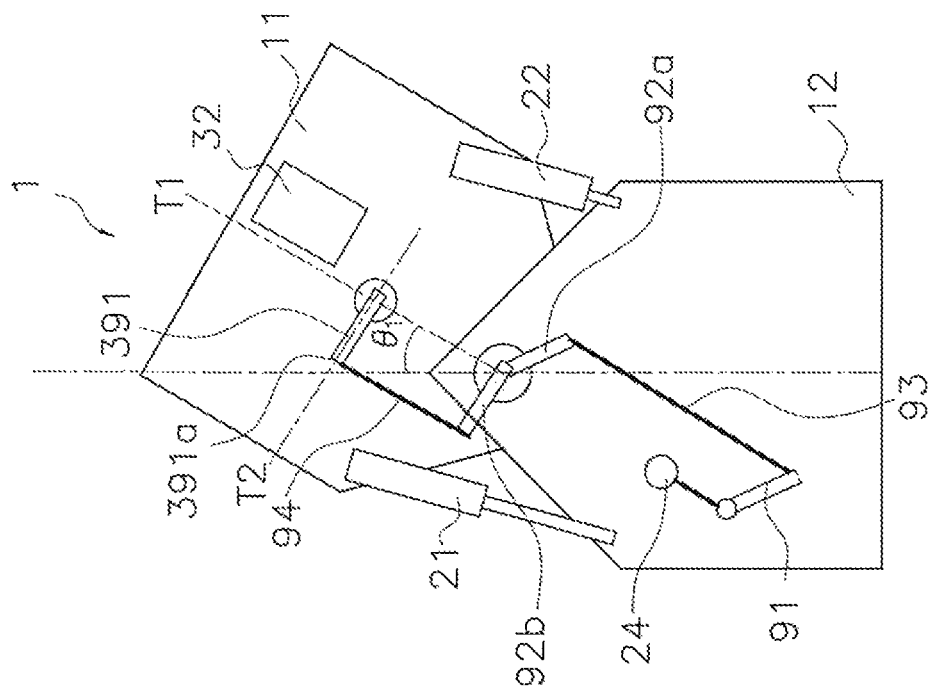
FIG. 18C is a diagram illustrating the steering operation of the wheel loader in Embodiment 3 of the present invention.

FIGS. 18A to 18D are diagrams showing the articulation of the wheel loader 1 in Embodiment 3. As shown in FIG. 18A, in this embodiment, for example, the neutral position Np is defined as a state in which a straight line T2 connecting the center axis O with a connecting portion 391a connecting the second rod member 94 and the input lever member 291 is disposed perpendicular to a straight line T1 connecting the center A of the articulation and the center axis O of the pilot valve 242.

As shown in FIG. 18B, when the joystick lever 24 is rotated to the right by the rotation angle θin and stopped at the rotation angle θin from the state shown in FIG. 18A, the first arm member 91 rotates to the right (see the arrow C), the first rod member 93 moves rearward (see the arrow D), and the second arm member 92a and the third arm member 92b rotate to the right (see the arrow E). This rotation moves the second rod member 94 forward (in the direction of the arrow F), and the input lever member 391 rotates to the right (see the arrow L). Consequently, the operation input shaft 61 also rotates by the rotation angle θin.

The operation spool 71 rotates to the right with respect to the operation sleeve 72 as the operation input shaft 61 rotates. Here, the operation sleeve 72 is integrated with the feedback sleeve 74, and the feedback sleeve 74 is linked to the feedback spool 73 by the second spring 65. The initial counterforce F2 of the second spring 65 is greater than or equal to the counterforce of the spring characteristic S1 of the first spring 64 shown in FIG. 7b. Therefore, the operation sleeve 72 does not rotate along with the operation spool 71, and the operation spool 71 rotates to the right with respect to the operation sleeve 72.

Thus, the operation spool 71 rotates to the right with respect to the operation sleeve 72 and moves to the right pilot position Rp, pilot pressure is supplied to the second pilot port P8, and pilot pressure is supplied to the second pilot chamber 35.

Consequently, the valve body 33 of the steering valve 32 moves to the right steering position Rs, fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22. Consequently, the steering angle θs gradually increases, and the front frame 11 is pointed to the right with respect to the rear frame 12 (see R in FIG. 18C).

Here, since the second arm member 92a and the third arm member 92b do not rotate together with the front frame 11, the input lever member 291 is pulled by the second rod member 94 and rotates to the left (see the arrow M) along with the articulation of the front frame 11 with respect to the rear frame 12.

Figure 18D:
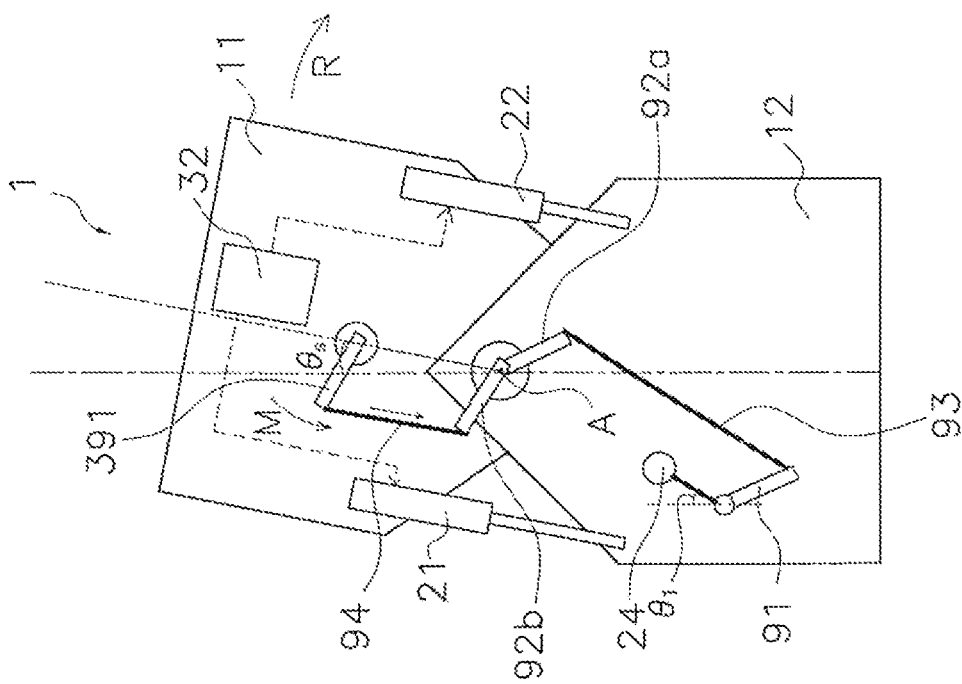
FIG. 18D is a diagram illustrating the steering operation of the wheel loader in Embodiment 3 of the present invention.

When the steering angle θs coincides with the rotation angle θ1 at which the joystick lever 24 was stopped, as shown in FIG. 18D, the position of the input lever member 391 is in a state in which the straight line T1 and the straight line T2 are perpendicular, and the pilot valve 242 is in the neutral position Np. In this case, the pilot pressure is the same in the first pilot chamber 34 and the second pilot chamber 35 of the steering valve 32, and the steering valve 32 is also in the neutral position Ns. Therefore, fluid is neither supplied to nor discharged from the left and right steering cylinders 21 and 22, and the steering angle θs is maintained at the rotation angle θ1.

Thus, when the joystick lever 24 is rotated to the right side and stopped at the predetermined rotation angle θ1, the steering angle θs is also maintained at the same rotation angle θ1. Consequently, the front frame 11 is kept pointing to the right with respect to the rear frame 12 at the rotation angle θ1.

Figure 18E:
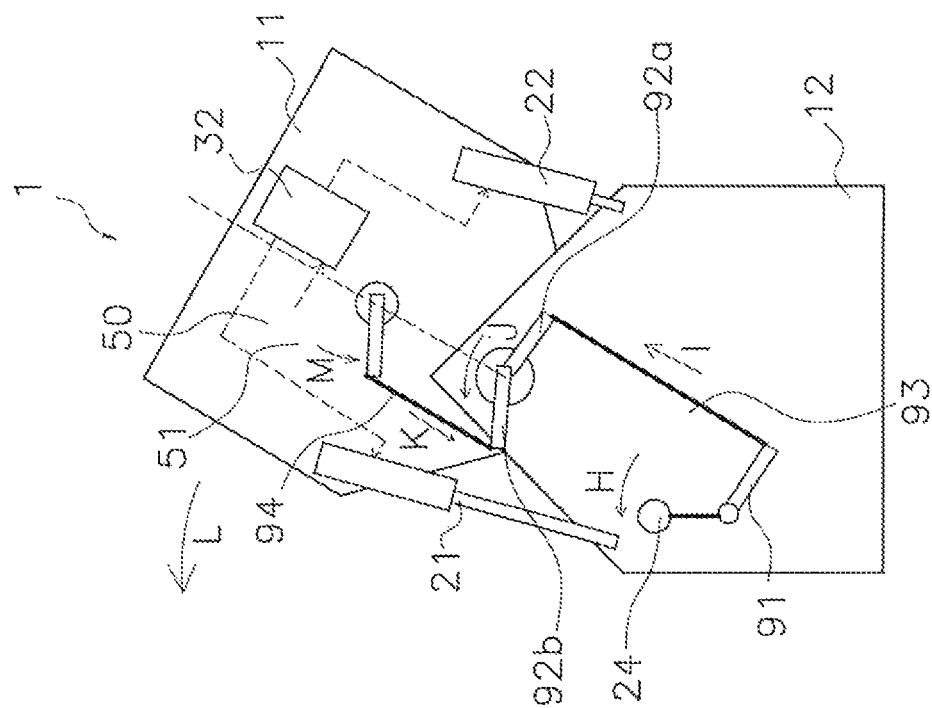
FIG. 18E is a diagram illustrating the steering operation of the wheel loader in Embodiment 3 of the present invention.

When the operator rotates the joystick lever 24 to the left (see the arrow H) and returns it from the right-side position toward the center position, the first arm member 91 also rotates to the left (see the arrow H) as shown in FIG. 18E, and the first red member 93 moves forward (see the arrow I). Then, the second arm member 92a and the third arm member 92b rotate to the left (see the arrow J) around the articulation center A, and the second rod member 94 moves rearward (see the arrow K). Consequently, the input lever member 291 also rotates to the left (see the arrow M), and the operation input shaft 61 also rotates by −θin. Then, the operation spool 71 rotates to the left with respect to the operation sleeve 72 and moves to the left pilot position Lp, and pilot pressure is supplied to the first pilot port P7. As a result, the valve body 33 of the steering valve 32 moves to the left steering position Ls, fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22. Consequently, the steering angle θs gradually decreases from the rotation angle θ1.

Here, since the second arm member 92a and the third arm member 92b do not rotate with the front frame 11, the input lever member 291 is pushed by the second rod member 94 and rotates to the right as the front frame 11 rotates with respect to the rear frame 12.

When the steering angle θs coincides with the rotation angle −θin of the joystick lever 24, as shown in FIG. 18A, the position of the input lever member 291 is in a state in which the straight line T1 and the straight line T2 are perpendicular, and the pilot valve 42 is in the neutral position Np.

Features, etc.

(1)

The wheel loader 1 (an example of a work vehicle) in this embodiment is an articulated type in which the front frame 11 and the rear frame 12 are linked. The wheel loader 1 comprises the steering cylinders 21 and 22 (an example of hydraulic actuators), the pilot valve 42 or 242 (an example of a control valve), the joystick lever 24, and the link mechanism 90, 290, or 390 (an example of a first link mechanism). The steering cylinders 21 and 22 are driven by hydraulic pressure and change the steering angle θs of the front frame 11 with respect to the rear frame 12. The pilot valve 42 or 242 controls the flow of fluid supplied to the steering cylinders 21 and 22. The joystick lever 24 is disposed in the cab 5 provided on the rear frame 12, and is operated by the operator. The link mechanism 90, 290, or 390 is disposed on the lower side of the cab 5 and transmits the operation of the joystick lever 24 to the pilot valve 42 or 242.

Here, since the link mechanism 90, 290, or 390 is provided on the lower side of the cab 5 in order to transmit the operation of the joystick lever 24 to the pilot valve 42 or 242, the pilot valve 42 or 242 can be disposed not only close to being directly under the driver's seat 5a, but also at a position away from the driver's seat, and can be disposed at a position that matches the structure of the wheel loader 1. There is therefore greater latitude in choosing where to install the valve.

(2)

With the wheel loader 1 (an example of a work vehicle) in this embodiment, the pilot valve 42 or 242 is disposed on the front frame 11.

Consequently, the pilot valve 42 or 242 can be disposed on the front frame 11 even when there is little room below the driver's seat 5a.

(3)

The wheel loader 1 (an example of a work vehicle) in this embodiment further comprises the steering valve 32. The steering valve 32 adjusts the flow of fluid supplied to the steering cylinders 21 and 22 on the basis of the pilot pressure inputted from the pilot valve 42 or 242. The pilot valve 42 or 242 controls the flow of fluid supplied from the steering valve 32 to the steering cylinders 21 and 22 by adjusting the pilot pressure.

Consequently, there is greater latitude in choosing where to install the pilot valve 42 or 242 for adjusting the pilot pressure.

With the above configuration, the pilot pressure is adjusted by the operator, the amount of fluid supplied from the steering valve 32 to the steering cylinders 21 and 22 is controlled, and the steering angle θs of the front frame 11 with respect to the rear frame 12 is changed.

(4)

With the wheel loader 1 (an example of a work vehicle) in this embodiment, the pilot valve 42 is disposed on the front frame 11. The pilot valve 42 has the spool 51 as a valve body, and the spool 51 moves along the axial direction to control the flow of fluid.

Providing the link mechanism 90 allows the operation of the joystick lever 24 to be transmitted to the front frame 11. Therefore, a spool valve can be used as the pilot valve 42 to which the operation of the joystick lever 24 is transmitted.

(5)

The wheel loader 1 (an example of a work vehicle) in this embodiment further comprises the force imparting component 27. The force imparting component 27 has the electric motor 111 as a drive source, and imparts an assisting force or a counterforce to the operation of the joystick lever 24.

Here, the force needed to operate the joystick lever is mainly determined by the pilot valve 42 or 242, but the operation feel can be changed to suit the state of the wheel loader 1 by imparting an assisting force or a counterforce to the operation of the joystick lever 24 with the force imparting component 27.

In operating the pilot valve 42 or 242 by operating the joystick lever 24, operation by the operator can be facilitated by imparting an assist force to the operation of the joystick lever 24. For example, when a spool valve is used as the pilot valve 42, since the link mechanism 90 is also interposed, it is assumed that the operation of the joystick lever 24 will be heavier, but operability is improved by imparting an assisting force.

For example, when the wheel loader 1 is moved at a low speed, operability can be improved by imparting an assisting force to the joystick lever 24 to reduce the force required to operate the joystick lever 24. On the other hand, when the travel speed of the wheel loader 1 is changed from low to high, running stability can be improved by imparting a counterforce to the joystick lever 24 to increase the force required to operate the joystick lever 24.

Thus, the operator's tactile sensation can be improved by appropriately varying the force required to operate the joystick lever according to the travel state of the wheel loader 1.

(6)

The wheel loader 1 (an example of a work vehicle) in this embodiment further comprises the connecting portion 25. The connecting portion 25 connects the joystick lever 24 to the link mechanism 90, 290, or 390. The force imparting component 27 further has the worm gear 112 (an example of a transmission mechanism) that transmits an assisting force or a counterforce to the connecting portion 25.

Consequently, the force of the force imparting component 27 can be transmitted to the connecting portion 25 that connects the joystick lever 24 and the pilot valve 42 or 242, and the force needed to operate the joystick lever 24 can be varied.

(7)

The wheel loader 1 (an example of a work vehicle) in this embodiment further comprises the torque sensor 103 and the controller 28. The torque sensor 103 senses torque generated by operation of the joystick lever 24. The controller 28 controls the electric motor 111 on the basis of the value sensed by the torque sensor 103.

Consequently, a force can be imparted according to the torque applied by the operator to the joystick lever 24. For example, the assisting force imparted by the force imparting component 27 can be increased when a large amount of torque is applied to the joystick lever 24 by the operator, and the assisting force can be decreased when the amount of torque is small.

(8)

With the wheel loader 1 (an example of a work vehicle) in this embodiment, the link mechanism 90 or 390 has the first arm member 91 (an example of an arm member), the rotation member 92, the first rod member 93, and the second rod member 94. The first arm member 91 is linked to the joystick lever 24 and rotates together the rotating operation with the joystick lever 24. The rotation member 92 is disposed so as to be rotatable coaxially with the articulation center A. The first rod member 93 links the first arm member 91 and the rotation member 92. The second rod member 94 links the rotation member 92 and the pilot valve 42 or 242.

This link mechanism 90 or 390 allows the operation of the joystick lever 24 provided to the rear frame 12 to be transmitted to the pilot valve 42 or 242 disposed on the front frame 11.

(9)

With the wheel loader 1 (an example of a work vehicle) in this embodiment, the pilot valve 242 has the operation input shaft 61 (an example of a first input member), the feedback input shaft 62 (an example of a second input member), the first spring 64 (an example of a biasing component), and the second spring 65 (an example of a biasing component). The operation input shaft 61 is linked to the joystick lever 24 via the link mechanism 290 or 390, and is displaced according to how much the joystick lever 24 is operated. The feedback input shaft 62 is fixed to the front frame 11. The first spring 64 and the second spring 65 bias the operation input shaft 61 to be in the neutral position Np where the amount of displacement of the operation input shaft 61 with respect to the feedback input shaft 62 is zero. The pilot valve 242 is disposed on the front frame 11 or at the articulation center A such that the operation input shaft 61 and the feedback input shaft 62 extend vertically. The pilot valve 242 controls the flow of fluid supplied to the steering cylinders 21 and 22 according to the amount of displacement of the operation input shaft 61 with respect to the feedback input shaft 62. The joystick lever 24 is operated against the biasing force of the first spring 64 and the second spring 65.

Consequently, even when there is little room under the driver's seat 5a, the pilot valve 242, which is a so-called rotary valve, can be disposed on the front frame 11 or at the articulation center A.

Also, with the above configuration, after the joystick lever 24 is operated, the steering angle θs changes following the joystick lever 24, and once the operation amount θin of the joystick lever 24 coincides with the steering angle θs, the pilot valve 242 is in the neutral position Np.

Also, the pilot valve 242 is thus provided with the first spring 64 and the second spring 65, and the operator operates the joystick lever 24 with an operating force that goes against the biasing force of the first spring 64 and the second spring 65. An assisting force or a counterforce can be imparted to the operation against the biasing force.

(10)

The wheel loader 1 (an example of a work vehicle) in this embodiment further comprises the feedback link mechanism 26 (an example of a second link mechanism). The pilot valve 242 (an example of a control valve) has the operation input shaft 61 (an example of a first input member), the feedback input shaft 62 (an example of a second input member), the first spring 64 (an example of a biasing component), and the second spring 65 (an example of a biasing component). The operation input shall 61 is linked to the joystick lever 24 via the link mechanism 290, and is displaced according to how much the joystick lever 24 is operated. The feedback input shaft 62 changes according to the steering angle θs. The first spring 64 and the second spring 65 bias the operation input shall 61 to be in the neutral position Np where the amount of displacement of the operation input shaft 61 with respect to the feedback input shaft 62 is zero. The feedback link mechanism 26 links the front frame 11 and the feedback input shaft 62 and transmits the change in the steering angle θs to the feedback input shaft 62. The pilot valve 242 is disposed so that the operation input shaft 61 and the feedback input shaft 62 run in the vertical direction at the articulation center A, and controls the flow of fluid supplied to the steering cylinders 21 and 22 according to the amount of displacement of the operation input shaft 61 with respect to the feedback input shaft 62. The joystick lever 24 is operated against the biasing force of the first spring 64 and the second spring 65.

Consequently, even when there is little room under the driver's seat 5a, the pilot valve 242, which is a so-called rotary valve, can be disposed on the front frame 11 or at the articulation center A.

Also, with the above configuration, alter the joystick lever 24 is operated, the steering angle θs changes following the joystick lever 24, and once the operation amount θin of the joystick lever 24 coincides with the steering angle θs, the pilot valve 242 is in the neutral position Np.

Also, the pilot valve 242 is thus provided with the first spring 64 and second spring 65, and the operator operates the joystick lever 24 with an operating force that goes against the biasing force of the first spring 64 and the second spring 65. An assisting force or a counterforce can be imparted to the operation against the biasing force.

Other Embodiments

Embodiments of the present disclosure have been described above, but the present disclosure is not limited to or by the above embodiments, and various modifications are possible without departing from the gist of the present disclosure.

(A)

In Embodiment 3, the pilot valve 242 is disposed on the front frame 11, but the pilot valve 242 may be disposed at the articulation center A. With the configuration shown in FIG. 19, the mounting bracket 468 is fixed to the front frame 11 and extends from the front frame 11 to the articulation center A. The feedback input shaft 62 and the housing 63 of the pilot valve 242 are fixed to the mounting bracket 468.

Figure 19:
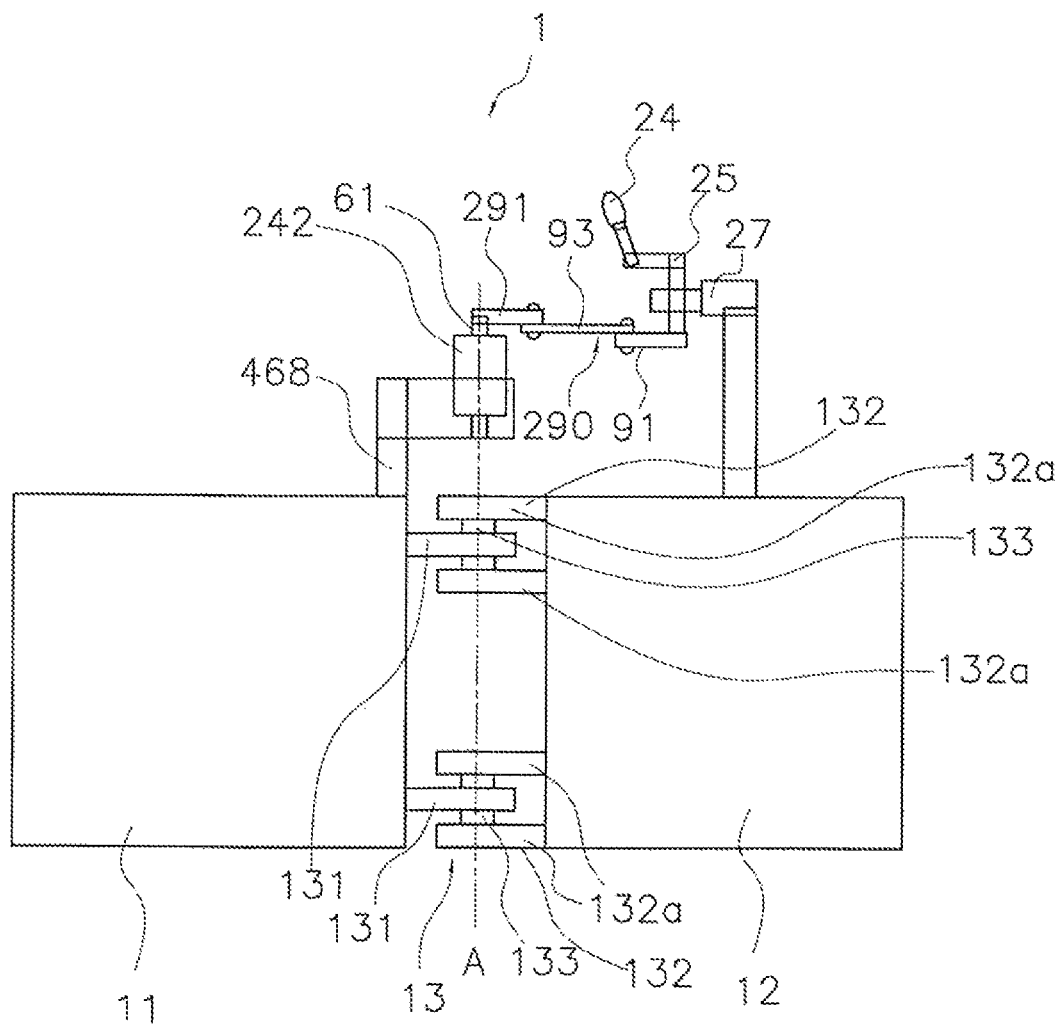
FIG. 19 is a simplified side view of the arrangement of a pilot valve in a modification example of Embodiment 3 of the present invention.

The pilot valve 242 is disposed on the upper side of the connecting shaft 13 and on the articulation center A. The pilot valve 242 is disposed so that its center axis O coincides with the articulation center A. In FIG. 19, the link mechanism 290 of Embodiment 2 is provided instead of the link mechanism 390 of Embodiment 3.

Thus disposing the pilot valve 242 on the articulation center A allows the pilot valve 242 can be disposed even when there is little room under the driver's seat 5a.

(B)

In the first embodiment, the pilot valve 42 is fixed to the front frame 11 so that its axial direction V coincides with the longitudinal direction of the vehicle body (indicated by the arrow Y in the drawing), but this is not the only option, and the pilot valve 42 may be inclined with respect to the longitudinal direction of the vehicle body.

Although not depicted in the drawings, the pilot valve 42 in Embodiment 1 may be fixed to the front frame 11 via the mounting bracket as in Embodiment 2, or may be directly fixed to the from frame 11. Also, the pilot valve 242 in Embodiment 2 may be directly fixed to the front frame.

(C)

In Embodiment 2, in order to make the explanation easier to understand, the pilot valve 242 is installed so that the neutral position Np is when the straight line T1 and the straight line T2 are perpendicular, but this is not the only option.

(D)

In the above embodiments, the configuration is such that the amount of fluid supplied from the steering valve 32 to the steering cylinders 21 and 22 is controlled according to the pilot pressure inputted from the pilot valve 42 (an example of a control valve), but the configuration may instead be such that the fluid from the pilot valve 42 is supplied directly to the steering cylinders 21 and 22.

(E)

In Embodiment 2, two springs are provided, namely, the first spring 64 and the second spring 65, but the second spring 65 need not be provided. In this case, for example, it is sufficient if the part between the feedback spool 73 and the feedback sleeve 74 is fixed.

(F)

In the above embodiments, a force is generated by the electric motor 111, but an electric motor is not the only option, and a hydraulic motor or the like may be used instead. In short, any actuator or the like that can generate the force to be imparted may be used.

(G)

In the above embodiments, the force imparting component 27 and the torque sensor 103 are provided to the output shaft 84 between the universal joint 83 and the link mechanism 90, but these may be provided to the steering operation shaft 81 between the universal joint 83 and the joystick lever 24.

(H)

In the above embodiments, the wheel loader 1 is given as an example of a work vehicle, but a wheel loader is not the only option, and an articulated dump truck, a motor grader, or the like may be used instead, as long as it is an articulated work vehicle.

Industrial Applicability

The work vehicle of the present invention has the effect of affording greater latitude in choosing where to install a valve, and is useful as a wheel loader or the like.

The invention claimed is:

1. An articulated work vehicle in which a front frame is linked to a rear frame, the work vehicle comprising:
    a hydraulic actuator configured to be driven by hydraulic pressure and configured to change a steering angle of the front frame with respect to the rear frame;
    a pilot valve configured to control flow of fluid supplied to the hydraulic actuator, the pilot valve being disposed on the front frame or at a center of articulation of the work vehicle;
    a joystick lever disposed in a cab provided on the rear frame, the joystick lever being configured to be operated by an operator;
    a first link mechanism disposed below the cab, the first link mechanism being configured to transmit an operation of the joystick lever to the pilot valve; and
    a steering valve that is disposed on the front frame and configured to adjust a flow of fluid supplied to the hydraulic actuator based on a pilot pressure inputted from the pilot valve,
    the pilot valve being configured to control the flow of fluid supplied from the steering valve to the hydraulic actuator by adjusting the pilot pressure.

2. The work vehicle according to claim 1, the pilot valve is disposed on the front frame.

3. The work vehicle according to claim 1, wherein
the pilot valve
- is disposed on the front frame,
- includes a spool configured to be movable along an axial direction, and
- is configured to control flow of fluid according to movement of the spool.

4. The work vehicle according to claim 1, further comprising:
a force imparting component including an electric motor as a drive source, the force imparting component being configured to impart an assisting force or a counterforce to an operation of the joystick lever.

5. The work vehicle according to claim 4, further comprising:
a connecting portion connecting the joystick lever and the first link mechanism,
the force imparting component further including a transmission mechanism configured to transmit the assisting force or the counterforce to the connecting portion.

6. The work vehicle according to claim 4, further comprising:
a torque sensor configured to sense torque generated by operation of the joystick lever; and
a controller configured to control the electric motor based on a value sensed by the torque sensor.

7. The work vehicle according to claim 1, wherein
the first link mechanism includes
an arm member linked to the joystick lever, the arm member being configured to rotate along with rotation of the joystick lever,
a rotation member disposed rotatably and coaxially with the center of articulation,
a first rod member linking the arm member and the rotation member, and
a second rod member linking the rotation member and the pilot valve.

8. The work vehicle according to claim 1, wherein
the pilot valve includes
a first input member linked to the joystick lever via the first link mechanism, the first input member being displaced according to how much the joystick lever is operated,
a second input member fixed to the front frame, and
a biasing component that exerts a biasing force against the first input member toward a neutral position in which an amount of displacement of the first input member with respect to the second input member is zero, and
the pilot valve
is disposed so that the first input member and the second input member extend in a vertical direction at the center of articulation or the front frame, and
controls flow of fluid supplied to the hydraulic actuator according to an amount of displacement of the first input member with respect to the second input member, and
the joystick lever is operated against the biasing force of the biasing component.

9. The work vehicle according to claim 1, wherein
the pilot valve includes
a first input member linked to the joystick lever via the first link mechanism, the first input member displaced according to how much the joystick lever is operated,
a second input member configured to change according to the steering angle, and
a biasing component that exerts a biasing force against the first input member toward a neutral position in which an amount of displacement of the first input member with respect to the second input member is zero,
the work vehicle further comprises:
a second link mechanism linking the front frame and the second input member, the second link mechanism configured to transmit change in steering angle to the second input member,
the pilot valve
being disposed so that the first input member and the second input member extend in a vertical direction at a center of articulation, and
controlling flow of fluid supplied to the hydraulic actuator according to an amount of displacement of the first input member with respect to the second input member, and
the joystick lever is operated against the biasing force of the biasing component.

10. The work vehicle according to claim 1, wherein
the pilot valve is disposed at a center of articulation.

* * * * *